(12) United States Patent
Daniels et al.

(10) Patent No.: US 6,268,865 B1
(45) Date of Patent: Jul. 31, 2001

(54) METHOD AND APPARATUS FOR THREE-DIMENSIONAL PAINTING

(75) Inventors: Eric Daniels, Glendale; Anastasios Lappas, Pasadena; George T Katanics, Burbank, all of CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 09/019,343

(22) Filed: Feb. 5, 1998

Related U.S. Application Data

(60) Provisional application No. 60/071,603, filed on Jan. 16, 1998, and provisional application No. 60/071,478, filed on Jan. 13, 1998.

(51) Int. Cl.[7] ............................ G06T 15/70; G06T 15/00; G06T 13/00
(52) U.S. Cl. .............................................................. 345/430
(58) Field of Search ............................................. 345/430

(56) References Cited

U.S. PATENT DOCUMENTS

| | | | | |
|---|---|---|---|---|
| 5,325,473 | * | 6/1994 | Monroe et al. | 345/122 |
| 5,592,597 | * | 1/1997 | Kiss | 345/419 |
| 5,630,043 | * | 5/1997 | Uhlin | 345/474 |
| 5,828,819 | * | 10/1998 | Do et al. | 345/431 |
| 5,838,331 | * | 11/1998 | DeBry | 345/430 |
| 5,847,712 | * | 12/1998 | Salesin et al. | 345/430 |

FOREIGN PATENT DOCUMENTS

0573153 * 12/1993 (EP) ............................. G06F/15/72

OTHER PUBLICATIONS

Pierre van Berkel, "SIAS, Strokes Interpreted Animated Sequences," computer Graphics Forum 8, pp. 35–45, 1989.*

Julie Daily, et al., "3D Painting: Paradigms for Painting in a New Dimension," *CHI '95 Mosaic of Creativity*, Short Papers, pp. 296–297, May 7–11, 1995.*

Jean–Daniel Fekete, et al., "TicTacToon: A Paperless System for Professional 2D Animation," Computer Graphics Proceedings SIGGRAPH 95, pp. 79–90, 1995.*

(List continued on next page.)

*Primary Examiner*—Mark R. Powell
*Assistant Examiner*—Jeffrey Allen Rossi
(74) *Attorney, Agent, or Firm*—Irell & Manella LLP

(57) ABSTRACT

A method and apparatus for painting 3-D objects and producing computer-assisted animated films are disclosed. After a 3-D model of an object is generated, a view of the object is selected for painting. An artist applies brush strokes to paint the selected view in 2-D space. The brush strokes are mapped to generate 3-D brush strokes. These 3-D brush strokes are then projected onto the 2-D views in the animation sequence, generating projected 2-D brush strokes which are used to paint the views in the animation sequence. Additional views may be selected that reveal surfaces that were occluded in the previously selected view. The artist applies additional brush strokes to paint the previously occluded areas. These additional brush strokes are mapped, and are used with the original brush strokes to re-generate the painted views in the animation sequence. A pixel color of a brush stroke may be determined based on the size, color, degree of opacity, degree of softness, pen pressures, pixel location, and brush profile. If brush strokes are leaf strokes, they are displaced by random amounts and rotated to random angles. A selective focus may be used to emphasize certain areas and de-emphasize others. Overlapping brush strokes may be painted in painter's order, depth order, or a blended combination of the two to allow a smooth transition between them. 2-D brush strokes can be blended to support build up and can be scaled to arbitrary size without pixel artifacts.

23 Claims, 21 Drawing Sheets

OTHER PUBLICATIONS

Siu Chi HSU, et al., "Drawing and Animation Using Skeletal Strokes," *Computer Graphics Proceedings, Annual Conference Series*, pp. 109–118, Jul. 24–29, 1994.*

Pat Hanrahan, et al., "Direct WYSIWYG Painting and Texturing on 3D shapes," *Computer Graphics*, vol. 24, No. 4, pp. 215–223, Aug. 1990.*

Bao Hujun, et al., "A Generation and Placement Technique for Complex Textures," *Journal of Software*, vol. 7, No. 9, 532–536, Sep. 1996.*

Barbara J. Meier, "Painterly Rendering for Animation," *Computer Graphics Proceedings, Annual Conference Series*, pp. 477–484, Aug. 4–9, 1996.*

* cited by examiner

FIG. 2
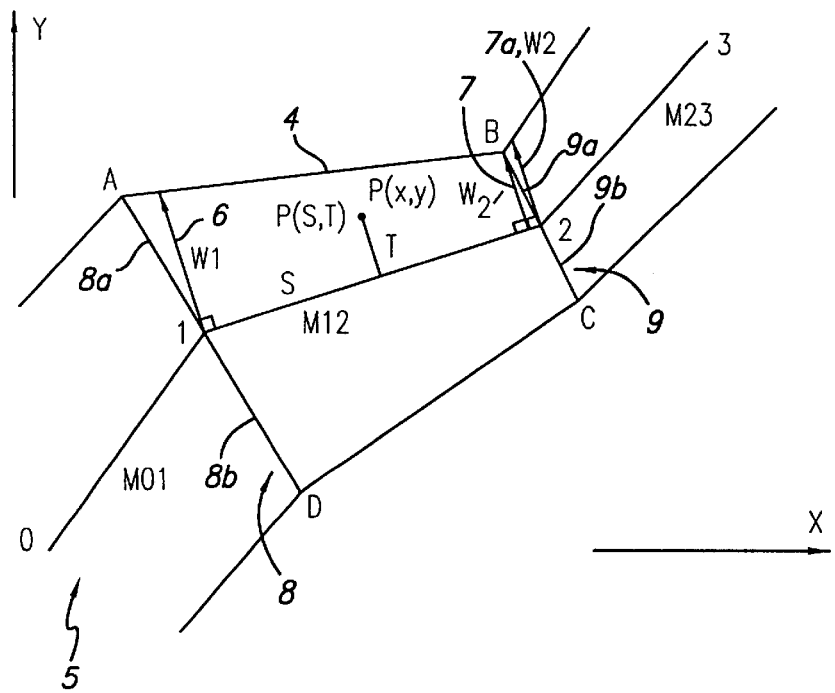
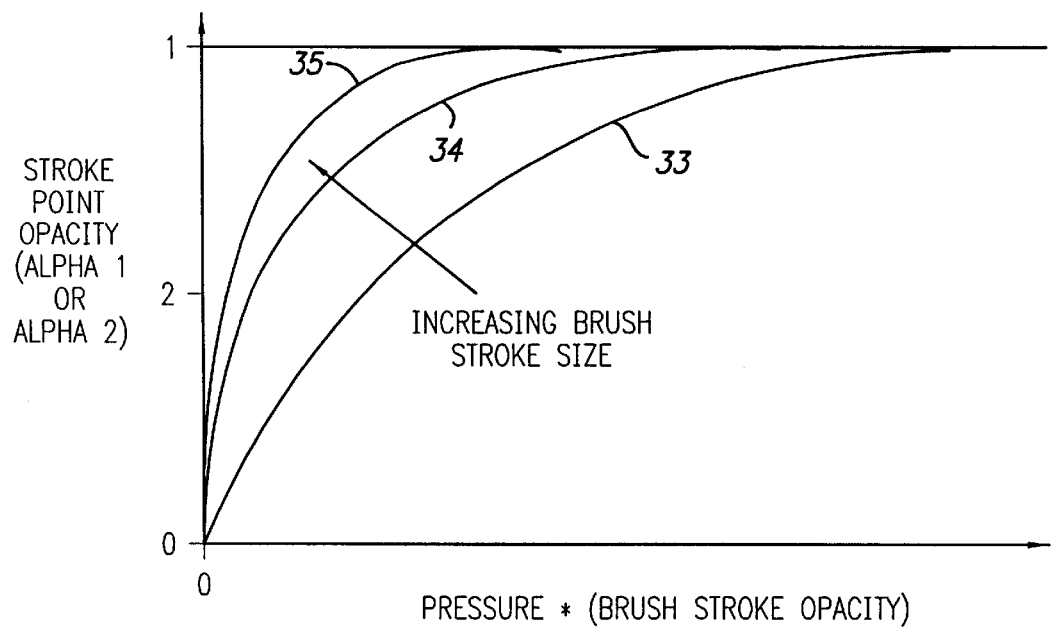
FIG. 3

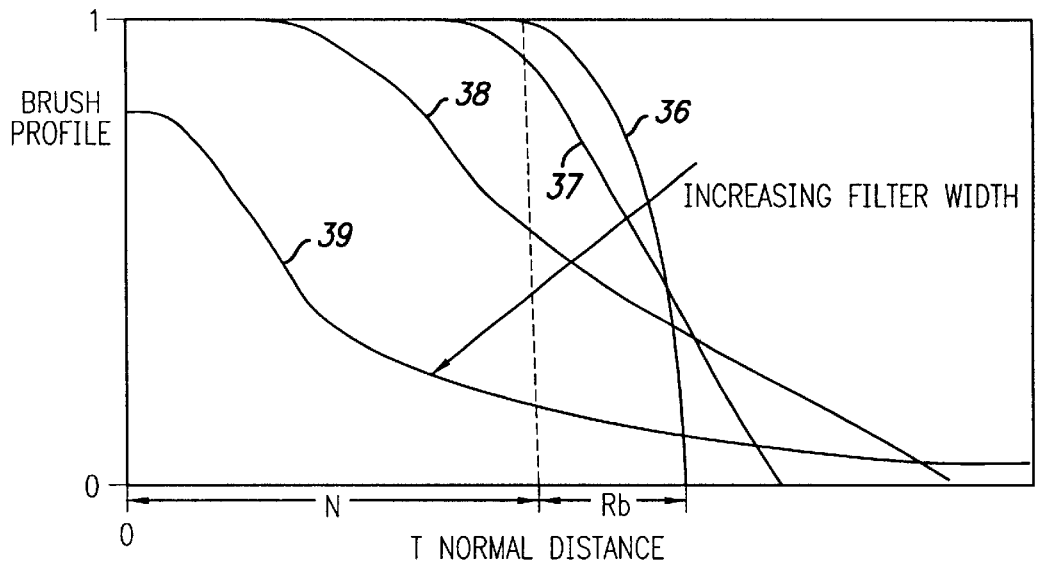

FIG. 4

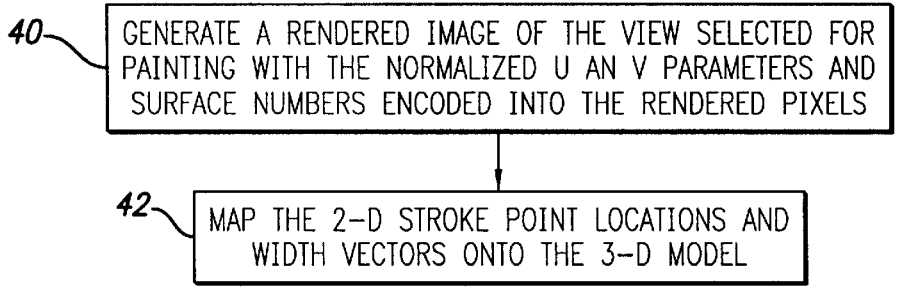

FIG. 5

1) ANIMATION DATA FILE CONTAINING GEOMETRY AND CAMERA INFORMATION FOR THE VIEW SELECTED FOR PAINTING IS CREATED BY THE MODELING/ANIMATION PACKAGE (AS WELL AS ADDITIONAL CAMERA VIEWS, IF REQUIRED).
2) DATA TRANSLATOR EXTRACTS GEOMETRY AND CAMERA DATA FOR THE VIEW SELECTED FOR PAINTING AND CREATES INTERMEDIATE-FORMAT TEXT DATA FILE (A COMMERCIALLY AVAILABLE PACKAGE CALLED SGI INVENTOR MAY BE USED).
3) MATERIAL LIBRARY GENERATOR FINDS SURFACE NAMES IN GEOMETRY TEXT DATA AND OUTPUTS THE NAME AND MINIMUM AND MAXIMUM U AND V VALUES INTO MATERIAL LIBRARY FILE AND MATERIAL NAME LIST FILE.
4) RENDERING PACKAGE RENDERS SURFACE INFO MAP USING SHADER WITH PARAMETERS FOR EACH SURFACE GIVEN IN MATERIAL LIBRARY.

```
//*****************************************
// STROKE OPACITY FALLOFF FUNCTION
double JPsimplebrush: :brushFalloff(double x, double width, double s, double R)
{
  double out;

if(width == 0.0) {
    if(x < -s-R || x > -s+R) out = 0.0;
    else if(x >= -s-R && x < -s) out = 1.0 - (x+s) * (x+s)/R/R;
    else if(x >= -s && x < s) out = 1.0;
    else if(x >= s && x <= s+R) out = 1.0 - (x-s) * (x-s) /R/R;
  } else {
    out = profileBasisFunc (-1, -s, 1.0/R, width, x, MAX(-s-R, x-width), MIN(x, -s))

+ profileBasisFunc(-1, 0.0, 0.0, width, x, MAX(-s, x-width), MIN(x, s))

+ profileBasisFunc(-1, s, 1.0/R, width, x, MAX(s, x-width), MIN(x, s+R))

+ profileBasisFunc(1, -s, 1.0/R, width, x, MAX(x, -s-R), MIN(x+width, -s)

+ profileBasisFunc(1, 0.0, 0.0, width, x, MAX(x, -s), MIN(x+width, s))

+ profileBasisFunc(1, s, 1.0/R, width, x, MAX(x, s), MIN(x+width, s+R));
  }
  if(out > 1.0) out = 1.0;
  else if(out < 0.0) out = 0.0;

return out;

}

//********************************************************
// BASIS FUNCTION FOR BUILDING BRUSH PROFILES...
double JPsimplebrush: :profileBasisFunc(int isign, double s, double invR,
                        double width, double x, double a, double b)
{
  if(b <= a) return 0.0;

double out, ixw, isr, invR_2;
  double a_2, a_3, a_4;
  double b_2, b_3, b_4;

a_2 = a*a; a_3 = a_2*a; a_4 = a_3*a;
  b_2 = b*b; b_3 = b_2*b; b_4 = b_3*b;
  invR_2 = invR*invR;

ixw = 1.0 + isign*x/width;
  isr = 1.0 - s*s*invR_2;

out = ixw*isr*(b-a)
        + ( ixw*s*invR_2 - isign*isr/2.0/width )*(b_2 - a_2)
        - ( isign*2.0*s/width + ixw) /3.0*invR_2*(b_3 - a_3)
        + isign*0.25*invR_2/width*(b_4 - a_4) ;

out /= width;
  return out;
}
```

1. GET THE SURFACE NAME AND U-V LIMITS FOR EACH SURFACE NUMBER FROM THE MATERIAL
2.  NAME LIST FILE
3. READ IN GEOMETRY INFORMATION FROM GEOMETRY TEXT DATA FILE
4. READ IN CAMERA INFORMATION FROM CAMERA TEXT DATA FILE
5. GET THE 2-D BRUSH STROKE DATA FILE NAMES FOR THE VIEW SELECTED FOR PAINTING
6.  FROM THE COMMAND LINE.
7. FOR EACH 2-D BRUSH STROKE DATA FILE NAME:
8.  OPEN A 2-D BRUSH STROKE DATA FILE FOR READ AND READ IN 2-D BRUSH STROKE DATA.
9.  COMPUTE 2-D STROKE WIDTH AND WIDTH DIRECTION AT EACH STROKE POINT FROM THE
10.   PEN PRESSURE AT THE STROKE POINT AND THE STROKE SIZE
11.  GET THE COLOR FOR EACH 2-D STROKE POINT FROM SURFACE INFORMATION MAP FILE
12.   (R COMPONENT OF THE COLOR CONTAINS SURFACE NUMBER; G CONTAINS U VALUE;
13.   B CONTAINS V VALUE).
14.  DETERMINE THE SURFACE NAME FOR EACH STROKE POINT AND COMPUTE THE
15.   APPROXIMATE U-V VALUES USING THE COLOR INFORMATION IN THE SURFACE
16.   INFORMATION MAP AND THE INFORMATION IN THE MATERIAL NAME LIST.
17.  REMOVE STROKE POINTS WHICH MISS SURFACES AND SPLIT STROKES WHICH FALL ON
18.   DIFFERENT OR DISCONNECTED SURFACES.
19.  USING THE ITERATIVE RAY TRACING TECHNIQUE, COMPUTE EXACT U-V VALUES FROM THE
20.   APPROXIMATE VALUES ACQUIRED ABOVE.
21.  USING THE GEOMETRY INFORMATION, EXACT U-V VALUES, AND SURFACE NAME ACQUIRED
22.   ABOVE, COMPUTE, FOR EACH STROKE POINT, THE WORLD-COORDINATE LOCATION (3-D
23.   STROKE POINT LOCATION) AND SURFACE NORMAL DIRECTION.
24.  IF LEAF STROKE, PERFORM THE LEAF STROKE MAPPING ROUTINE.
25.  GENERATE 3-D STROKE WIDTH AND WIDTH DIRECTION FROM THE 2-D STROKE WIDTH AND
26.   WIDTH DIRECTION FOR EACH STROKE POINT USING THE STROKE WIDTH MAPPING
27.   ROUTINE.
28.  COMPUTE MAXIMUM WIDTH OF EACH STROKE IN 3-D. (USED FOR STROKE OVERLAP
29.   ROUTINE.)
30. END (FOR EACH 2-D BRUSH STROKE DATA FILE NAME.)
31. WRITE OUT THE MAPPED STROKE DATA INTO THE MAPPED STROKE DATA FILE.

1. GET THE SURFACE NAME FOR EACH SURFACE NUMBER FROM THE MATERIAL NAME LIST FILE
2. FROM THE COMMAND LINE, GET THE PATH OF THE MAPPED STROKE DATA
3. FILE, AND THE CORRESPONDING MATERIAL NAME TEXT FILE MATERIAL NAME LIST OF EACH
4. VIEW SELECTED FOR PAINTING.
5. FOR EACH ANIMATION FRAME n FROM START FRAME TO END FRAME:
6.   FOR EACH VIEW SELECTED FOR PAINTING:
7.     READ IN GEOMETRY INFORMATION FROM GEOMETRY TEXT DATA FILE FOR THIS ANIMATION
8.      FRAME, FOR ALL SURFACES FOUND IN MATERIAL NAME LIST FILE FOR THIS VIEW SELECTED FOR
9.     PAINTING.
10.   END FOR (EACH VIEW SELECTED FOR PAINTING.)
11.   READ IN CAMERA INFORMATION FROM CAMERA TEXT DATA FILE
12.   READ IN LIGHT INFORMATION FOR ILLUMINATION AND SELECTIVE FOCUS SOURCES FROM LIGHT
13.    TEXT DATA FILE
14.   FOR EACH VIEW SELECTED FOR PAINTING:
15.     READ IN THE STROKES FROM MAPPED STROKE DATA FILE FOR THIS VIEW SELECTED FOR
16.     PAINTING.
17.     GET THE SURFACE NAME FOR EACH STROKE POINT FROM THE SURFACE NUMBER USING THE
18.      INFORMATION IN MATERIAL NAME LIST FOR THIS VIEW SELECTED FOR PAINTING.
19.     USING THE GEOMETRY INFORMATION, THE U-V VALUES ACQUIRED BY THE STROKE
20.      MAPPER AND THE SURFACE NAME ACQUIRED ABOVE, COMPUTE, FOR EACH STROKE POINT,
21.      THE WORLD-COORDINATE LOCATION (3-D STROKE POINT LOCATION) AND SURFACE NORMAL
22.      DIRECTION.
23.     USING THE GEOMETRY INFORMATION, COMPUTE END POINT OF EACH WIDTH VECTOR IN WORLD
24.      COORDINATES FOR THIS ANIMATION FRAME.
25.     IF LEAF STROKE, DISPLACE EACH 3-D STROKE POINT AND WIDTH VECTOR END POINT
26.      ACCORDING TO THE LEAF STROKE DISPLACEMENT ROUTINE.
27.     COMPUTE THE SELECTIVE FOCUS INTENSITY FOR EACH 3-D STROKE POINT FROM THE
28.      DISTANCE BETWEEN ITS WORLD COORDINATE AND THAT OF EACH SELECTIVE FOCUS CENTER.
29.     USING THE CAMERA INFORMATION, PROJECT THE 3-D STROKE POINTS ONTO 2-D SCREEN
30.      COORDINATES OF CAMERA VIEW FOR THIS ANIMATION FRAME.
31.     USING THE CAMERA INFORMATION, PROJECT THE 3-D STROKE WIDTHS ONTO 2-D SCREEN
32.      COORDINATES OF CAMERA VIEW FOR THIS ANIMATION FRAME.
33.     COMPUTE BOUNDING BOXES FOR ALL STROKES PROJECTED IN THIS 2-D VIEW. (USED TO
34.      SPEED UP CLIPPING TO VIEW)
35.     COMPUTE MAXIMUM WIDTH OF EACH STROKE PROJECTED INTO THIS 2-D VIEW. (USED
36.      TO SPEED UP CLIPPING TO VIEW.)
37.     SPLIT STROKES WHICH WRAP AROUND CURVED EDGES SO THAT SURFACE NORMALS OF ANY
38.      STROKE EITHER ALL POINT TOWARD VIEWER OR AWAY FROM VIEWER. (USED TO SIMPLIFY
39.      THE STROKE OVERLAP ROUTINE).
40.     ASSIGN SEQUENCE NUMBERS TO STROKES SO THAT STROKES WITH NORMALS POINTING AWAY
41.      FROM VIEWER ARE NUMBERED IN REVERSE ORDER. (THIS ENSURES CORRECT PAINTERS-
42.      ORDER OF PAINTING STROKES WHEN SURFACE IS TURNED OPPOSITE TO THE DIRECTION FROM
43.      WHICH IT WAS PAINTED.)
44.   END FOR (EACH VIEW SELECTED FOR PAINTING.)
45.   PAINT THE STROKES FOR THIS ANIMATION FRAME USING THE STOKE OVERLAP ROUTINE AND THE
46.    BRUSH IMPLEMENTATION TECHNIQUE.
47.    WRITE OUT THE PAINTED ANIMATION FRAME TO RENDERED IMAGE FILE.
48. END FOR (EACH ANIMATION FRAME.)

FIG. 17
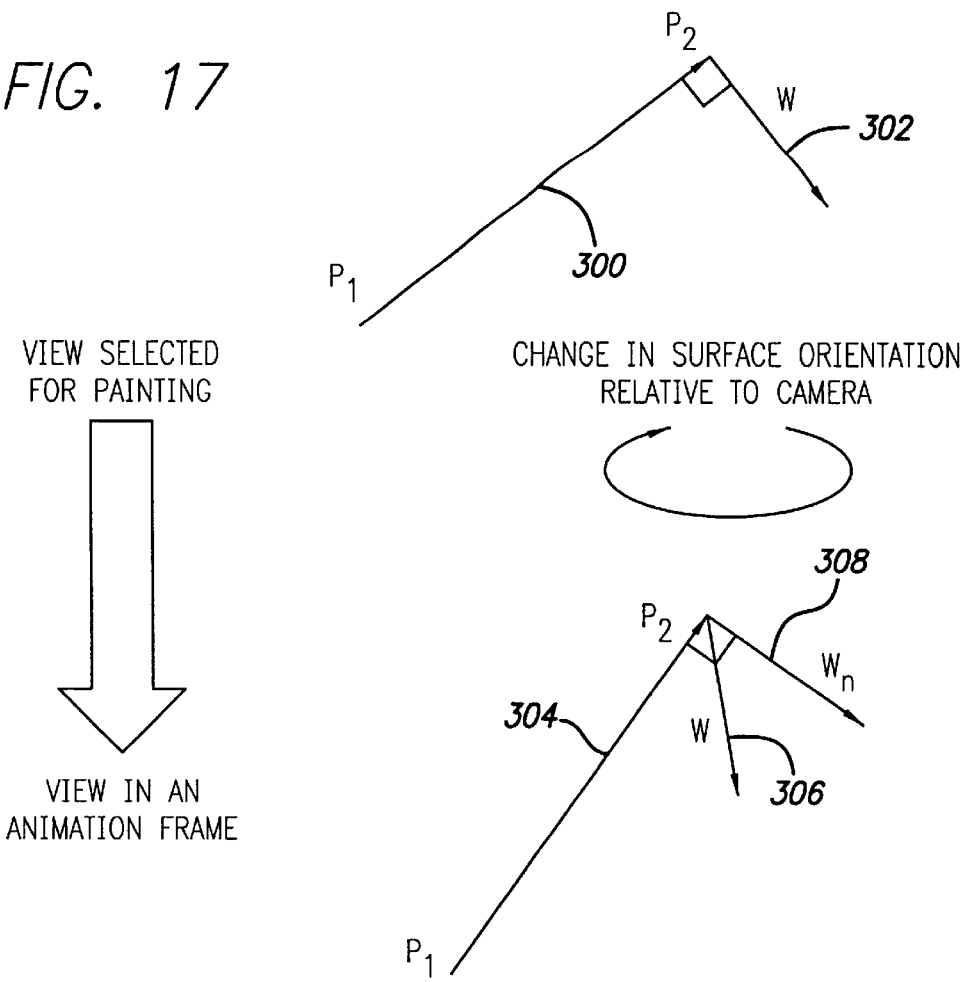
VIEW SELECTED FOR PAINTING
↓
VIEW IN AN ANIMATION FRAME
CHANGE IN SURFACE ORIENTATION RELATIVE TO CAMERA
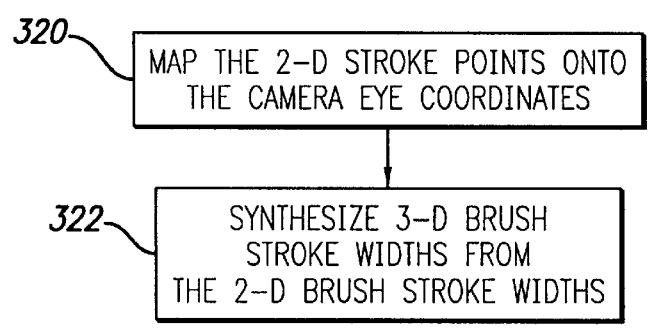
FIG. 18

```
1   FOR EACH STROKE IN THIS 2-D BRUSH STROKE DATA FILE:
2    FOR EACH STROKE POINT IN THIS STROKE:
3     BEGIN MAP STROKE POINT TO CAMERA EYE COORDINATES FOR THIS FRAME:
4      USING THE SURFACE MAP INFORMATION IN SURFACE INFORMATION MAP AND MATERIAL
5      NAME LIST, DETERMINE THE U-V VALUES IN THE SCREEN PIXEL COORDINATES.
6      USING THE GEOMETRY INFORMATION, DETERMINE THE 3-D STROKE POINT LOCATION
7      AND DIRECTION OF SURFACE NORMAL IN WORLD COORDINATES FROM U-V VALUES IN
8      THE SCREEN PIXEL COORDINATES.
9      USING THE CAMERA INFORMATION, DETERMINE THE 3-D STROKE POINT LOCATION AND
10     DIRECTION OF THE SURFACE NORMAL IN CAMERA EYE COORDINATES FROM THE STROKE
11     POINT LOCATION AND DIRECTION OF SURFACE NORMAL IN WORLD COORDINATES.
12     ROTATE THE SURFACE NORMAL SO ITS DIRECTION IS RELATIVE TO THE VIEW VECTOR OF
13     THE STROKE POINT RATHER THAN THE CAMERA-EYE-VIEW Z-AXIS.
14     ADD DISTANCE OF CAMERA TO VIEW PLANE TO Z COMPONENT OF THE 3-D STROKE
15     POINT LOCATION TO GET DISTANCE OF POINT TO CAMERA RATHER THAN TO VIEW PLANE.
16    END MAP STROKE POINT TO CAMERA EYE COORDINATES FOR THIS FRAME.
17   END FOR EACH STROKE POINT OF THIS STROKE.
18   FOR EACH STROKE POINT OF THIS STROKE:
19    BEGIN SYNTHESIZE 3-D BRUSH STROKE WIDTH FROM 2-D BRUSH STROKE WIDTH:
20     REVERSE PROJECT THE 2-D WIDTH VECTOR INTO THE TANGENT PLANE AT THE STROKE
21     POINT CREATE INITIAL 3-D WIDTH VECTOR $W_t$.
22     COMPUTE THE MINIMUM-LENGTH 3-D WIDTH VECTOR $W_p$.
23     IF THE 3-D WIDTH VECTOR IS LESS THAN OR EQUAL TO A FACTOR TIMES THE
24     MINIMUM-LENGTH VIEW VECTOR:
25     USE THE 3-D WIDTH VECTOR IN THE TANGENT PLANT AT THE STROKE POINT.
26     ELSE IF (THE 3-D WIDTH VECTOR IS GREATER THAN A FACTOR TIMES THE
27     MINIMUM-LENGTH VIEW VECTOR):
28     COMPUTE AND USE A LIMITED-LENGTH 3-D WIDTH VECTOR $W$.
29     END IF (THE 3-D WIDTH VECTOR IS GREATER THAN A FACTOR TIMES THE...)
30     MAP THE 3-D WIDTH VECTOR FROM CAMERA EYE COORDINATE TO WORLD
31     COORDINATES.
32     MAP THE 3-D WIDTH VECTOR FROM WORLD COORDINATES INTO INVARIANT
33     COORDINATES.
34    END SYNTHESIZE 3-D BRUSH STROKE WIDTH FROM 2-D BRUSH STROKE WIDTH.
35   END FOR EACH STROKE POINT IN THIS STROKE.
36  END FOR EACH STROKE IN THIS 2-D BRUSH STROKE DATA FILE.
```

FIG. 19

```
1   FOR EACH STROKE POINT IN THIS ANIMATION FRAME:
2    FOR EACH STROKE POINT IN THIS STROKE:
3     BEGIN MAP STROKE POINT TO NORMALIZED SCREEN COORDINATES FOR THIS ANIMATION
4     FRAME:
5      USING THE GEOMETRY INFORMATION, DETERMINE THE 3-D STROKE POINT LOCATION AND
6        DIRECTION OF SURFACE NORMAL IN WORLD COORDINATES FROM THE U-V VALUES.
7      IF THERE IS LEAF MAPPING INVOLVED, PERFORM THE LEAF STROKE DISPLACEMENT
8        ROUTINE TO THE 3-D STROKE POINT.
9      USING THE CAMERA INFORMATION, DETERMINE THE 3-D STROKE POINT LOCATION AND
10       DIRECTION OF THE SURFACE NORMAL IN CAMERA EYE COORDINATES FROM THE 3-D
11       STROKE POINT LOCATION AND SURFACE NORMAL IN WORLD COORDINATES.
12     ROTATE THE SURFACE NORMAL SO ITS DIRECTION IS RELATIVE TO THE VIEW VECTOR OF THE
13       STROKE POINT RATHER THAN THE CAMERA-EYE-VIEW Z-AXIS.
14     ADD DISTANCE OF CAMERA TO VIEW PLANE TO Z COMPONENT OF THE 3-D STROKE POINT
15       LOCATION TO GET THE DISTANCE OF POINT TO CAMERA RATHER THAN TO VIEW PLANE.
16     USING THE CAMERA INFORMATION, APPLY THE PERSPECTIVE AND VIEW TRANSFORMS TO
17       GET THE PROJECTED 2-D STROKE POINT LOCATION IN NORMALIZED SCREEN COORDINATES.
18   END MAP STROKE POINT TO NORMALIZED SCREEN COORDINATES FOR THIS ANIMATION FRAME.
19   END FOR EACH STROKE POINT OF THIS STROKE.
20   FOR EACH STROKE POINT OF THIS STROKE:
21    BEGIN RECOMPUTE WIDTH OF STROKE SEGMENT FOR THIS FRAME:
22     MAP THE 3-D STROKE WIDTH VECTOR FROM THE ROTATIONALLY-INVARIANT COORDINATE
23       SYSTEM TO THE WORLD COORDINATE SYSTEM.
24     ADD THE 3-D STROKE POINT WORLD COORDINATES TO THE 3-D STROKE WIDTH VECTOR
25       WORLD COORDINATES TO GET THE WORLD COORDINATES OF THE 3-D STROKE WIDTH VECTOR
26       END POINT.
27     IF THERE IS LEAF MAPPING INVOLVED, PERFORM THE LEAF STROKE DISPLACEMENT ROUTINE
28       TO THE 3-D STROKE WIDTH VECTOR END POINT.
29     USING THE CAMERA INFORMATION, DETERMINE THE LOCATION OF THE 3-D STROKE WIDTH
30       VECTOR END POINT IN CAMERA EYE COORDINATES FROM THE LOCATION IN WORLD
31       COORDINATES.
32     USING THE CAMERA INFORMATION, APPLY THE PERSPECTIVE AND VIEW TRANSFORMS TO
33       GET THE LOCATION OF THE PROJECTED 2-D STROKE WIDTH VECTOR END POINT IN
34       NORMALIZED SCREEN COORDINATES FROM THE LOCATION IN CAMERA EYE COORDINATES.
35     SUBTRACT THE LOCATION OF THE PROJECTED 2-D STROKE WIDTH VECTOR END POINT IN
36       NORMALIZED SCREEN COORDINATES FROM THE LOCATION OF THE PROJECTED 2-D STROKE
37       POINT IN NORMALIZED SCREEN COORDINATES (COMPUTED ABOVE) TO GET THE
38       PROJECTED 2-D STROKE WIDTH VECTOR IN NORMALIZED SCREEN COORDINATES.
39     RE-ALIGN THE PROJECTED 2-D STROKE WIDTH VECTOR TO MAKE IT PERPENDICULAR TO THE
40       PROJECTED 2-D STROKE SEGMENT.
41    END RECOMPUTE WIDTH OF STROKE SEGMENT FOR THIS FRAME
42   END FOR EACH STROKE POINT IN THIS STROKE.
43  END FOR EACH STROKE IN THIS ANIMATION FRAME.
```

*FIG. 21*

```
1   FOR EACH BRUSH STROKE IN THIS ANIMATION FRAME:
2    FOR EACH STROKE POINT OF THIS BRUSH STROKE:
3     FOR EACH PIXEL PAINTED BY THE STROKE SEGMENT STARTED BY THIS STROKE POINT:
4      (COMPUTE COLOR OF PIXEL-DONE USING THE BRUSH IMPLEMENTATION TECHNIQUE.)
5      GO TO HEAD OF CLUMP LIST FOR THIS PIXEL
6      INDICATE COLOR NOT YET ADDED TO CLUMP LIST.
7      DO WHILE COLOR NOT ADDED TO CLUMP LIST.
8       IF THE CLUMP LIST IS EMPTY OR THE STROKE POINT Z IS MORE THAN 4 FEATURE SIZES
9       LESS THAN THE CLUMP Z:
10       CREATE A NEW CLUMP WITH THE COLOR AND ADD IT TO LIST IN FRONT OF CURRENT
11       CLUMP.
12       IF THE CLUMP IS HIGHLY OPAQUE:
13        REMOVE ALL CLUMPS AFTER IT ON THE LIST.
14       END IF THE CLUMP IS HIGHLY OPAQUE.
15       INDICATE COLOR ADDED TO CLUMP LIST.
16      ELSE IF THE STROKE POINT Z IS LESS THAN 4 FEATURE SIZES GREATER THAN THE
17      CLUMP Z:
18       BLEND THE COLOR WITH THE CURRENT CLUMP (AS DESCRIBED IN FIGURE 26 AND IN THE
19       COLOR COMPOSITION OPERATION SECTION).
20       IF THE CLUMP HAS BECOME HIGHLY OPAQUE:
21        REMOVE ALL CLUMPS AFTER IT ON THE LIST.
22       END IF THE CLUMP HAS BECOME HIGHLY OPAQUE.
23       INDICATE COLOR ADDED TO CLUMP LIST.
24      ELSE (IF THE STROKE POINT Z IS MORE THAN 4 FEATURE SIZES GREATER THAN THE
25      CLUMP Z:
26       GO TO THE NEXT CLUMP IN THE LIST.
27      END IF (THE STROKE POINT Z IS MORE THAN 4 FEATURE SIZES GREATER THAN THE
28      CLUMP Z).
29     END DO WHILE COLOR NOT ADDED TO CLUMP LIST.
30    END FOR EACH PIXEL PAINTED BY THIS STROKE SEGMENT STARTED BY THIS STROKE POINT.
31   END FOR EACH STROKE POINT OF THIS BRUSH STROKE.
32  END FOR EACH BRUSH STROKE IN THIS ANIMATION FRAME.
33  FOR EACH PIXEL ON THE SCREEN.
34   BLEND ALL CLUMPS OF THE PIXEL TO CREATE FINAL COLOR.
35  END FOR EACH PIXEL ON THE SCREEN.
```

FIG. 28

METHOD AND APPARATUS FOR THREE-DIMENSIONAL PAINTING

RELATED APPLICATIONS

This application claims priority of provisional applications Ser. No. 60/071,478 filed Jan. 13, 1998 and Ser. No. 60/071,603 filed Jan. 16, 1998, the specifications of which are incorporated herein by reference.

BACKGROUND OF THE INVENTION

1. Field of the Invention

The invention relates to computer graphics, and more specifically to software and tools for computer-assisted animation.

2. Related Art

Animation has long been an alternative to live-action photography for making films. The look of animation and its ability to exceed the bounds of the physically possible have allowed an art to develop feature films widely regarded as classics. Computer-assisted animation has reduced the labor required to produce an animated feature film and led to a boom in animated films in the 1990s.

Traditional animated films tend to have fairly static backgrounds. Furthermore, the "camera" in the animated film cannot move as freely as the camera in a live-action film, because unrestrained camera movement would require repainting of the background at each frame, a prohibitive expense.

Computer-assisted animation opens up the possibility of making the backgrounds of animated films more dynamic. Various techniques could be employed for this purpose. One possibility would generate backgrounds by means of computer rendering of 3-D objects. The animator creates a mathematical description of the background objects being animated and the light sources illuminating them. A computer program generates from that mathematical description an image which closely resembles a photograph of those objects. The process of generating such an image is referred to as "3-D rendering" or simply "rendering." Rendering is in a sense a computer simulation of photography. Within this framework, animation is achieved by specifying the movements of mathematically-modelled objects, the light sources illuminating them, and the imaginary camera taking the simulated photographs, and then rendering a suitable number of animation frames. This manner of making animated films was employed, for example, in the feature film Toy Story.

Unfortunately, computer rendering is not very suitable for backgrounds. It is often difficult to model mathematically the objects typically found in backgrounds, such as trees. Furthermore, all computer rendered objects have a distinctive hard-surfaced look, familiar to anyone who has seen Toy Story, which may be perceived as undesirable. This hard-surfaced look arises in part from the fact that the colors of these objects' surfaces are modeled by means of what is called a "texture map," in which the computer program in effect uses a two-dimensional drawing, generated separately by an artist, and covers the surfaces with that drawing somewhat in the manner of wallpaper to determine the surfaces' colors.

A refinement of computer rendering which has been suggested is to have the artist be able to see instantaneously what the scene will look like as he or she modifies the drawing used for texture mapping. In this way, the artist can more easily tailor that drawing to achieve a desired effect in the final rendered image. The artist is in effect drawing color directly onto the 3-D surface. This refinement is unfortunately both expensive to achieve in terms of computational resources and not a natural way of painting for the artist.

Ideally, an artist would make a two-dimensional drawing of a 3-D scene, and then a computer program would generate views of that 3-D scene from different camera angles using the artist's two-dimensional drawing. The artist would in effect be painting in the familiar way, in two dimensions, and the 3-D effects would be generated by the computer. This is, strictly speaking, impossible, because changes in the camera position could bring into view portions of objects which are occluded in the view painted by the artist, and some additional artist input is consequently required to establish how those occluded areas should look. It would be nonetheless desirable to approximate the ideal as closely as possible.

It is therefore desirable to allow an artist to paint backgrounds of animated films in the familiar manner in which a two-dimensional background is painted (with a computer paint program), and then to have the computer generate automatically views of the 3-D scene which those backgrounds depict from other camera angles.

It is also desirable to have computer's generation of additional views require little additional input from the artist, while still giving the artist the necessary creative control over the final product. Furthermore, it is desirable to have the additional views retain the same painterly appearance as the original view drawn by the artist.

SUMMARY OF THE INVENTION

The present invention provides methods and apparatus for painting 3-D objects and producing computer-assisted animated films. After a 3-D model of an object is generated, a view of the object is selected for painting. An artist applies brush strokes to paint the selected view of the object in 2-D space. The brush strokes are mapped onto the surfaces of the object in 3-D space, generating 3-D brush strokes. These 3-D brush strokes are then projected onto the 2-D views in the animation frames, generating projected 2-D brush strokes which are used to paint the views in the animation frames.

Additional views may be selected from the painted views in the animation frames that reveal surfaces that were occluded in the previously selected view. The artist applies additional brush strokes to paint the previously occluded areas. These additional brush strokes are mapped onto the surfaces of the object in 3-D space, and are used together with the brush strokes in the previously selected view to re-generate the painted views in the animation frames.

The present invention also provides methods and apparatus for determining pixel colors used to display brush strokes. When an artist applies 2-D brush strokes to paint a view of an object using a pen or stylus and a graphics tablet, the computer obtains (i) 2-D stroke points by sampling the tracks of the 2-D brush strokes as they are applied by the artist and (ii) a pen pressure at each of the 2-D stroke points. The pixel color of a brush stroke at a pixel may be determined as a function of the size, color, degree of opacity, and degree of "softness" chosen by the artist for the brush stroke, the pen pressures, the pixel location, and a brush profile at the pixel location.

In addition, the present invention provides brush strokes that are "leaf strokes." When brush strokes are leaf strokes, they are displaced by random amounts in random directions to create a mass of leaves. When an artist paints brush strokes as leaf strokes, he/she paints them as if the leaves are forward-facing him/her. The present invention then displaces the forward-facing leaves by random amounts and rotates them to random angles to produce a volume of leaves.

Additionally, the present invention allows a selective focus which is a painting style where certain painted areas are emphasized and others are de-emphasized. The emphasized or focus areas tend to have more contrast and saturated color, whereas the de-emphasized areas tend to have more muted colors, often transitioning to a background or atmospheric color.

Furthermore, the present invention provides a technique for painting overlapping brush strokes. When two overlapping brush strokes are on the same surface of an object, they are painted in painter's order, which means the brush stroke painted last by an artist is painted on top. When the two overlapping brush strokes are on different surfaces of the object, they are painted in depth order, which means the brush stroke that is closer to the camera is painted on top. When surfaces move relative to the camera, the painting order may change, which may cause a pop. To avoid the popping problem, the two priority orders mentioned above may be blended to provide a smooth transition between them. The present invention also provides a method of painting an arbitrary number of overlapping brush stokes which uses a minimum amount of memory.

BRIEF DESCRIPTION OF THE DRAWINGS

FIG. 2 illustrates the geometric relationship among stroke points, stroke widths, stroke segments, and a stroke segment area.

FIG. 3 illustrates a graphical form of a stroke point opacity.

FIG. 4 illustrates brush profiles before and after filtering.

FIG. 4a illustrates a computer code of an analytical function that represents a brush profile.

FIG. 5 is a flow chart for a 3-D mapper routine according to one embodiment of the present invention.

FIG. 7 illustrates an execution sequence of the surface translator shown in FIG. 6.

FIG. 10 is one exemplary pseudo code for the stroke mapper routine.

FIG. 14 is one exemplary pseudo code for the stroke renderer routine.

FIG. 17 illustrates how stroke width vectors are re-aligned according to one embodiment of the present invention.

FIG. 18 is a flow chart for a stroke width mapping routine according to one embodiment of the present invention.

FIG. 19 is one exemplary pseudo code for the stroke width mapping routine.

FIG. 21 is one exemplary pseudo code for the stroke width projection routine.

FIG. 28 is one exemplary pseudo code for the clump rendering routine described in FIG. 27.

DETAILED DESCRIPTION OF THE INVENTION

The present invention provides methods and apparatus for electronically painting 3-D objects including, but not limited to, 3-D computer-modeled background scenes for animated films. In the following detailed description, numerous specific details are set forth to provide a full understanding of the present invention. It will be obvious, however, to one skilled in the art that the present invention may be practiced without some of these specific details. In other instances, well-known structures and techniques have not been shown in detail not to unnecessarily obscure the present invention.

Overall Process of the Invention

Figure 1:
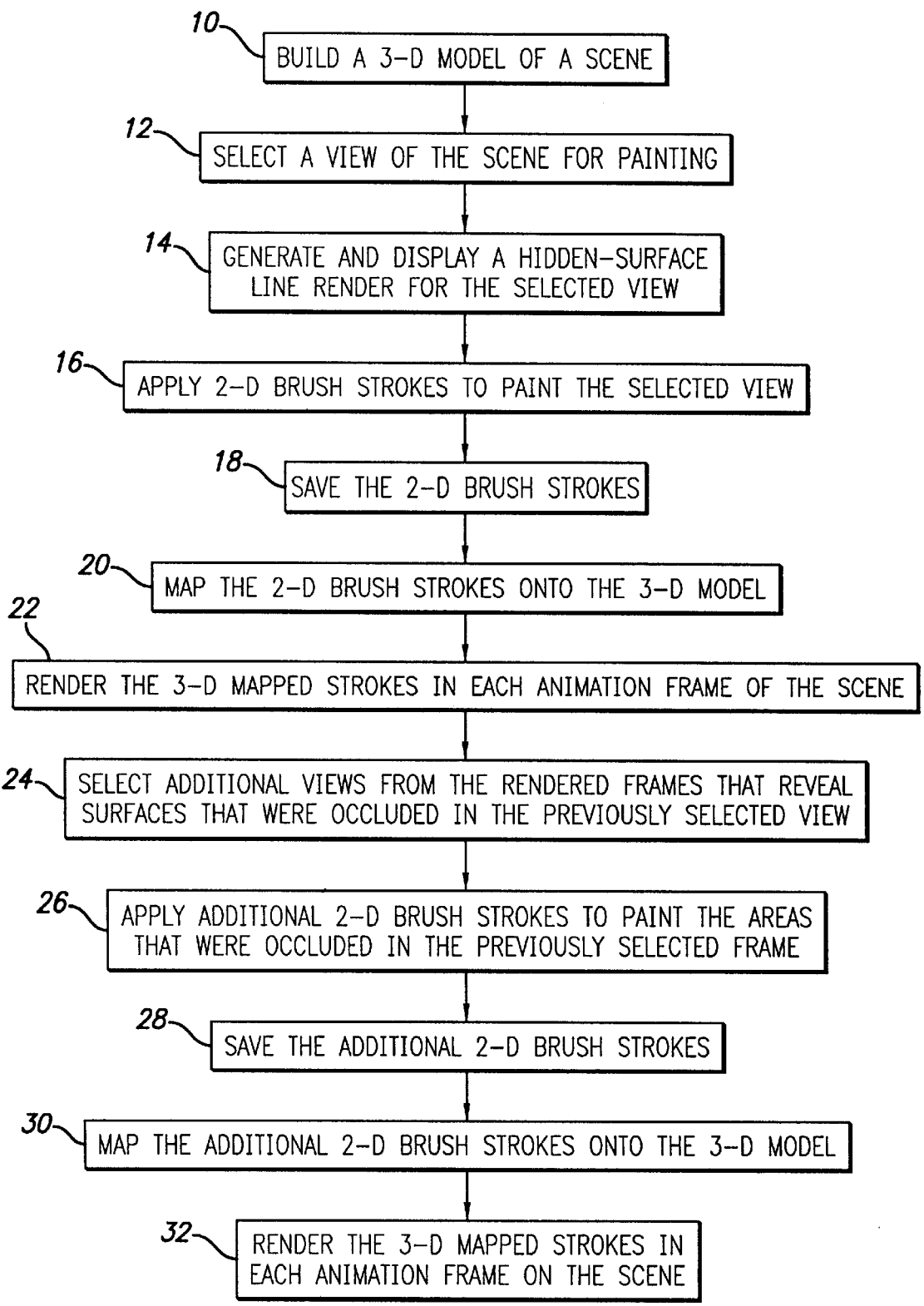
FIG. 1 is a flow chart illustrating an overall process of the present invention.

Now referring to FIG. 1, an overall process of electronically producing and painting background scenes used in an animated film is illustrated according to one embodiment of the present invention. It should be noted that the present invention is not limited to painting background scenes and may be used to paint various other types of objects. At block 10, a 3-D model of a scene is created. The model includes information such as geometry, camera moves, and light. A traditional modeling/animation software package such as Alias may be used.

At block 12, a view (or views) of the scene is selected for painting. This selected view may be one of the views in the animation frames of the scene. It does not need to be the view in the first frame of the animation sequence. Alternatively, this view may be selected from various views of the 3-D model of the scene as they are shown on a computer monitor. In this instance, the view selected may or may not be one of the views included in the animation frames. At block 14, a hidden-surface line render (i.e., a wireframe render) which shows a 2-D geometric outline of the selected view of the scene is generated and displayed.

At block 16, 2-D brush strokes are applied to paint the selected view using the line render as a guide. A 2-D brush stroke can be obtained, for example, by placing a pen (such as a pen 1016a in FIG. 29) on a graphics tablet (such as a graphics tablet 1016 in FIG. 29) and dragging the pen on the tablet. In this instance, the 2-D brush stroke ends when the pen is lifted from the tablet. Brush strokes are described in detail with reference to FIG. 2.

At block 18, the 2-D brush strokes are saved into a file. This file is typically a text file rather than a graphical image containing a list of parameters used to create the 2-D brush strokes (e.g., size, color, stroke locations). The types of information saved are described in detail with reference to FIG. 8.

At block 20, the 2-D brush strokes are mapped onto the 3-D model to generate 3-D brush strokes. This mapping process is described in detail in the 3-D Mapping Process section. At block 22, the 3-D mapped brush strokes are rendered in each animation frame of the scene, using the camera view and 3-D surface positions in each such frame. If one of the animation frames was selected for painting at block 12 then the view of the selected frame as painted at block 16 is identical to the view of the selected frame as rendered at block 22. The rendering process is described more fully in the Stroke Rendering Process section.

At block 24, one or more additional views are selected that reveal surfaces of the 3-D model that were occluded in the previously selected view. Typically these additional views are selected from the animation frames rendered at block 22. Alternatively, views other than those of the animation sequence may be used to allow more efficient painting, e.g., when such a view shows more surfaces than any animation sequence view. At block 26, the surfaces that were previously occluded are painted by applying additional 2-D brush strokes. These additional 2-D brush strokes can be blended with the 2-D brush strokes already existing in the views. At block 28, the additional 2-D brush strokes are saved.

At block 30, the additional 2-D brush strokes are mapped onto the 3-D model. At block 32, the stroke rendering process is repeated to produce a painted view in each animation frame.

Brush Implementation Technique

Now referring to FIGS. 2–4, a brush implementation technique of the present invention is described. The brush implementation technique is a method of determining pixel colors for displaying brush strokes on a screen. This technique is used at blocks 16, 22, and 32 in FIG. 1 to display the brush strokes.

In electronically painting a 3-D object such as a 3-D animation background scene, the present invention allows an artist to paint the 3-D object in 2-D space, which is familiar to the artist, rather than 3-D space. A traditional artist uses a brush and canvas and places brush strokes on the canvas to paint. In electronic painting of the present invention, an artist may use a pen in place of a brush (such as a pen 1016a in FIG. 29) and draw on a graphics tablet instead of a canvas (such as a graphics table 1016 in FIG. 29) to paint a 2-D view of the 3-D object.

According to one embodiment of the present invention, a 2-D brush stroke is created when the artist places the pen on the tablet and drags it on the tablet. A 2-D brush stroke starts when a pen pressure is applied against the tablet and ends when the pen pressure is released from the tablet. When the artist places the pen on the tablet again and drags it, it creates another 2-D brush stroke.

2-D Brush Stroke Parameters

The present invention provides various brush stroke parameters that an artist can choose for each 2-D brush stroke such as size, color, the degree of opacity, and the degree of "softness." Each of these parameters is described below in detail. The present invention provides various brush stroke sizes. This allows an artist to choose a wide or narrow brush stroke. It should be noted that the number of different sizes provided is a matter of choice.

The present invention also provides various brush stroke colors. An artist can select a color for each 2-D brush stroke. In addition, an artist can select the degree of brush stroke opacity. For example, if the artist selects 0% opacity for a brush stroke, then the brush stroke is completely transparent. If the artist selects 100% opacity for a brush stroke, then the brush stroke is completely opaque. If the artist selects a value between 0% and 100% for a brush stroke, then the brush stroke is somewhat transparent depending on the value chosen.

Furthermore, an artist can select the degree of brush stroke "softness." This softness parameter is used to determine the width of a filter to be applied to a brush profile, as described in detail with reference to FIG. 4.

Geometry of a 2-D Stroke Segment

Now referring to FIG. 2, the geometric relationship among 2-D stroke points, 2-D stroke widths, 2-D stroke segments, and a 2-D stroke segment area is described. When an artist drags a pen on a tablet creating a 2-D brush stroke, the present invention generates 2-D stroke points by sampling the track of the 2-D brush stroke. A 2-D brush stroke is thus composed of 2-D stroke points. For example, a 2-D brush stroke 5 in FIG. 2 is composed of 2-D stroke points 0, 1, 2, and 3. Typically, the sampling rate is constant so that the slower a pen is moved, the closer the 2-D stroke points are. The present invention obtains the 2-D location (e.g., x-y coordinates) at each 2-D stroke point and the pen pressure at each 2-D stroke point. The pen pressure may vary between zero and one. The present invention uses the pressure to modulate the painting, as described later in detail, providing an artist a more natural painting medium.

Still referring to FIG. 2, any two adjacent 2-D stroke points are connected by a 2-D stroke segment. For example, stroke points 0 and 1 are connected by a stroke segment M01. Stroke points 1 and 2 are connected by a stroke segment M12. Stroke points 2 and 3 are connected by a stroke segment M23.

The present invention provides a 2-D stroke width at each 2-D stroke point. For example, a 2-D stroke width W1 is provided at 2-D stroke point 1, and a 2-D stroke width W2 is provided at 2-D stroke point 2 in FIG. 2. A 2-D stroke width at a 2-D stroke point is a function of (i) the 2-D brush stroke size, which is the size of the brush stroke selected by the artist and (ii) the pressure at the 2-D stroke point. For example, the 2-D stroke width W1 is function of the size of the 2-D brush stroke 5 and the pressure at the 2-D stroke point 1. An equation for a 2-D stroke width may be expressed as below:

$$W = \text{size} * \text{pressueScaleFn}(\text{pressure})$$

where the function pressureScaleFn may be a piecewise linear function of pressure which ranges between zero and one. When the pressure is zero, the width is zero. When the pressure is one, the width is equal to the size.

In the preferred embodiment, a 2-D stroke width has a 2-D stroke width direction which is perpendicular to its respective 2-D stroke segment. For example, the 2-D stroke width W1's direction is perpendicular to the 2-D stroke segment M12. The 2-D stroke width W2's direction is perpendicular to the 2-D stroke segment M12. It should be noted that a 2-D stroke with direction does not need to be perpendicular to its respective 2-D stroke segment. For example, a 2-D stroke width may lie along the line A-1 or line B-2. A 2-D stroke width and its direction form a 2-D stroke width vector. For example, the 2-D stroke width W1 and its direction form a 2-D stroke width vector 6. The 2-D stroke width W2 and its direction form a 2-D stroke width vector 7a.

Still referring to FIG. 2, a 2-D stroke segment area ABCD is obtained as follows. A line 8 is drawn that bisects the angle 012. A line 9 is drawn that bisects the angle 123. The 2-D stroke width vector 7a is translated to a vector 7 so that the end point of the vector 7 intersects the line 9 at point B. A line 4 is drawn that intersects the end point of the 2-D stroke width vector 6 and point B. Point A is the intersection point of lines 4 and 8. Once point A is known, the length of line 8a can be determined. The length of line 8b is equal to the length of line 8a. Hence, point D can be determined. Point C is determined in a similar manner. The 2-D stroke segment area ABCD defines an area where the pixel colors within the 2-D stroke segment area ABCD are affected by the 2-D stroke widths W1 and W2, the 2-D stroke points 1 and 2, and the 2-D stroke segment M12.

In FIG. 2, each pixel is represented in the screen coordinate system (x,y) and segment coordinate system (S,T). T is the normal distance of a pixel from its corresponding 2-D stroke segment, and S is the location of a pixel along the direction of its corresponding 2-D stroke segment. For example, a pixel P can be represented as P(x,y) in the screen coordinate system or P(S,T) in the segment coordinate system where T is the normal distance from the 2-D stroke segment M12, and S represents the location of pixel P along the 2-D stroke segment M12.

Pixel Colors

Now referring to FIGS. 2–4, how the brush implementation technique of the present invention determines pixel colors is described. A pixel color generated by a 2-D brush stroke at any given pixel is determined by the following formula:

Pixel color=(R*Alpha, G*Alpha, B*Alpha, Alpha), where R, G, and B are the red, green, and blue components of a 2-D brush stroke color selected by the artist. For example, in FIG. 2, the pixel P(S,T) is affected by the 2-D brush stroke 5. The R, G, and B for the pixel P(S,T) are the red, green, and blue components of the color selected for the 2-D brush stroke 5. Alpha is given by:

Alpha=brushProfile(T)*[Alpha1+$xi$*(Alpha2−Alpha1)], where xi=S/Length. Length is the length of a 2-D stroke segment that affects the pixel. For example, in FIG. 2, the length of the 2-D stroke segment M12 is used in determining the pixel color that affects the pixel P(S,T).

Alpha1 and Alpha2 are the "stroke point opacity" values at the start and end points of a 2-D stroke segment that affects the pixel. A stroke point opacity value is computed as a function of the pressure at its corresponding 2-D stroke point and the size of its corresponding 2-D brush stroke. This allows a stroke point opacity value to scale with the size and pressure of a 2-D brush stroke to simulate real brush strokes. In other words, the wider a brush stroke is, the more opaque the brush stroke is. In addition, the larger the pressure is at a 2-D stroke point, the more opaque the brush stroke is. Alpha1 and Alpha2 are given by:

Alpha1=alphaFn(size, pressure1);

Alpha2=alphaFn(size, pressure2), where size is the size of a 2-D brush stroke, selected by the artist, that affects the pixel. Pressure1 is the pen pressure at the start point of a 2-D stroke segment that affects the pixel. Pressure2 is the pen pressure at the end point of the 2-D stroke segment that affects the pixel. For instance, in FIG. 2, in determining the pixel color at the pixel P(S,T), Alpha1 is the stroke point opacity value at the 2-D stroke point 1, and Alpha2 is the stroke point opacity value at the 2-D stroke point 2. The size used for Alpha1 and Alpha2 is the size of the 2-D brush stroke 5 chosen by the artist. Pressure1 for the pixel P(S,T) is the pen pressure acquired at the 2-D stroke point 1, and pressure2 for the pixel P(S,T) is the pen pressure acquired at the 2-D stroke point 2.

Now referring to FIG. 3, a form of the function alphaFn is shown according to one embodiment of the present invention. The x-axis represents the pen pressure at a 2-D stroke point multiplied by its respective brush stroke opacity. The y-axis is the value of the stroke point opacity that varies from zero to one. As the brush stroke size increases, the stroke point opacity increases. For example, the curve 33 represents the stroke point opacity for a narrow brush stroke, and the curve 35 represents the stroke point opacity for a wide brush stroke. It should be noted that while FIG. 3 depicts one example of the function alphaFn, different alphaFn functions may be used with the invention.

Now referring to FIG. 4, the brush profile function brushProfile(T) is scaled by a local width W, where W=W1+$xi$*(W2−W1). The x-axis represents T which is the normal distance from a 2-D stroke segment, and the y-axis is the brush profile that varies from zero to one. A curve 36 represents an original brush profile before filtering. The curve 36 is flat in the region N, and has a parabolic falloff in the region Rb, the so called bristle scale. The bristle scale is typically given by:

Rb=(brush stroke size)/15.

Curves 37, 38, and 39 represent brush profiles after filtering. An example of a filter that can be used is a simple tent filter. The curve 37 is the brush profile after being filtered using a narrow filter. The curve 39 is the brush profile after being filtered using a wide filter. The filter width is selected by an artist when he/she chooses the degree of softness for a brush stroke. For example, when an artist chooses a low degree of softness for the 2-D brush stroke 5 in FIG. 2, a narrow filter corresponding to the low degree of softness is selected to filter the brush profile used for the pixels in the 2-D stroke segment area ABCD in FIG. 2. When an artist chooses a high degree of softness for the 2-D brush stroke 5 in FIG. 2, a wide filter corresponding to the high degree of softness is selected to filter the brush profile used for the pixels in the 2-D stroke segment area ABCD in FIG. 2. Filtering produces brush profiles that are "softer."

As shown in FIG. 4, the present invention utilizes a brush profile that is an analytical function which varies with distance. An example of an analytical function that represents a brush profile is shown in FIG. 4a. An analytical function may include an explicit continuous function (in contrast to an implicit discrete function). A simple example of an explicit function is y=3x+1. A simple example of an implicit function is 10=3x+1. A filter used on a brush profile is also an analytical function rather than a numerical function. The function Alpha described above is also analytical. Because the invention uses analytical functions, the 2-D brush strokes of the present invention are resolution independent (e.g., no pixellation occurs when zoomed in). If a brush stroke painted by an artist is originally displayed on a screen as a 200×100 pixel image, and then later it is displayed on a screen as a 1000×1000 pixel image, the accuracy of the brush stroke is not lost. This resolution independence of the invention allows the 3-D brush strokes which are mapped from the 2-D brush strokes to be scaled, which is a necessity for representing the 3-D brush strokes at different distances and angles to a camera. An additional benefit of using a brush profile, filter, and Alpha function that are continuous functions is speed and efficiency.

Optimization

The computation of the brush profile function can be optimized by computing the function brushProfile(T) only at a predetermined number of points along a front and a rear segment of a 2-D stroke segment area (e.g., the lines AD and BC in FIG. 2). Then the function Alpha is also computed only at these predetermined points. These points are independent of the resolution of an image buffer used to display the brush strokes. They are convenient points associated with the normal distance T. An Alpha for a pixel P is a linear interpolation of the Alpha values at the nearest points on the front and rear segments (e.g., the lines AD and BC) of the pixel's 2-D stroke segment area. This linear interpolation scheme is much faster than computing the brush profile function at each pixel. But this scheme is accurate only when the width variation between the two 2-D stroke points is not too large. The linear interpolation scheme seems to be appropriate when the ratio of the widths at the two 2-D stroke points (e.g., W2/W1) is between 0.9 and 1.1.

Color Compositing Operation

When two 2-D brush strokes overlap at a given pixel, the pixel colors are composited as follows. If a first 2-D brush stroke has a pixel color $C_b$ at a give pixel, and a second 2-D brush stroke has a pixel color $C_d$ at the same pixel, then a composite pixel color $C_{cmp}$ at that pixel is obtained by:

$$C_{cmp} = (1 - e^* A_b)^* C_d + (1 - (1-e)^* A_d)^* C_b,$$

where e varies from zero to one. The value e can be a blended color value of R1 in FIG. 25 divided by 100. The blended color value is described in detail with reference to FIG. 25. $A_b$ is the Alpha value of $C_b$, and $A_d$ is the Alpha value of $C_d$. When e is zero, $C_{cmp}$ is $C_d + (1 - A_d)^* C_b$, where if the Alpha value (i.e., opacity) of $C_d$ is one (i.e., completely opaque), then $C_{cmp}$ is simply $C_d$. If the Alpha value of $C_d$ is zero (i.e., completely transparent), then $C_{cmp}$ is $C_d + C_b$. When e is one, $C_{cmp}$ is $(1 - A_b)^* C_d + C_b$, where if the Alpha value of $C_b$ is one, then C is simply $C_b$. If the Alpha value of $C_b$ is zero, then $C_{cmp}$ is $C_d + C_b$.

3-D Mapping Process

Now referring to FIGS. 5–10, the 3-D mapping process of the present invention as previously mentioned at block 20 in FIG. 1 is described more fully below. Referring to FIG. 5, the 3-D mapping process may include two steps according to one embodiment of the present invention. At block 40, a surface mapper routine generates a rendered image of the view selected for painting at block 16 in FIG. 1 with the normalized u-v parameters and surface numbers (described below) encoded into the rendered pixels. This process is described more fully with reference to FIGS. 6 and 7.

At block 42 in FIG. 5, the 2-D stroke points and width vectors are mapped onto the 3-D model of the object to generate 3-D stroke points and width vectors. This process is described more fully with reference to FIGS. 8–10. During the mapping process, the 2-D stroke segments that are defined by two 2-D stroke points are mapped as a unit onto the 3-D model without mapping any sub-points between the two 2-D stroke points.

This is in contrast to a traditional exact texture mapping where a 2-D stroke segment is subdivided into micro-polygons, and 3-D mapping takes place based on surface angle and camera distance at each such micro-polygon. It is important to avoid texture mapping to ensure that the brush strokes maintain their painterly look after mapping.

It should be noted that stroke segments are defined by two stroke points whose distance to the camera may be different. In addition, the stroke width and direction (as determined by the orientation of the underlying surface) may be different at each of the stroke points. Therefore, to achieve a continuous look, interpolation of 2-D stroke points is necessary along a projected 2-D stroke segment. The interpolation process is performed during the painting steps of the stroke rendering process (e.g., blocks 204 and 206 in FIG. 13).

Surface Mapper

Figure 6:
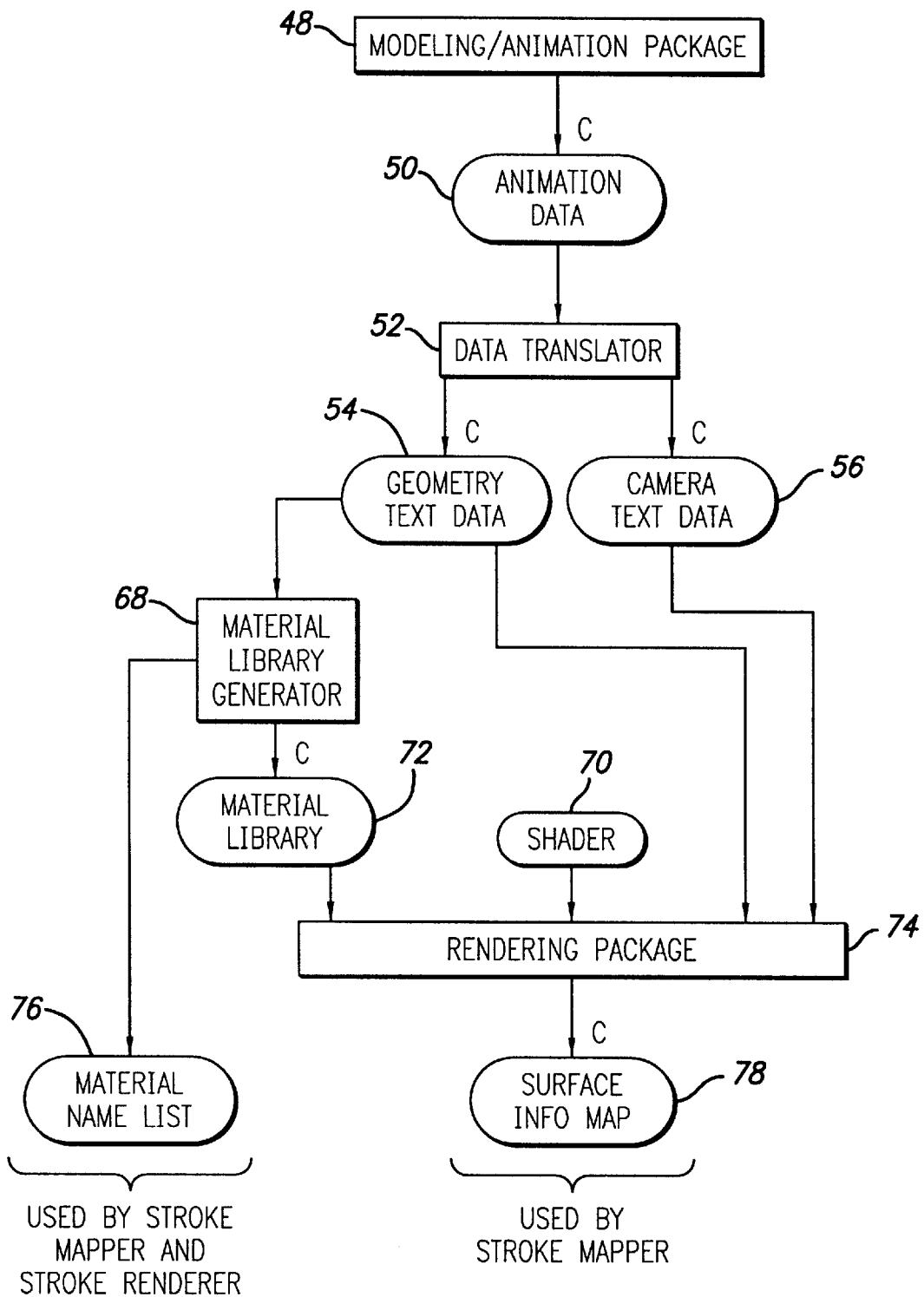
FIG. 6 is a block diagram showing an implementation of a surface mapper using a conventional animation/modeling package and a conventional rendering package.
Figure 8:
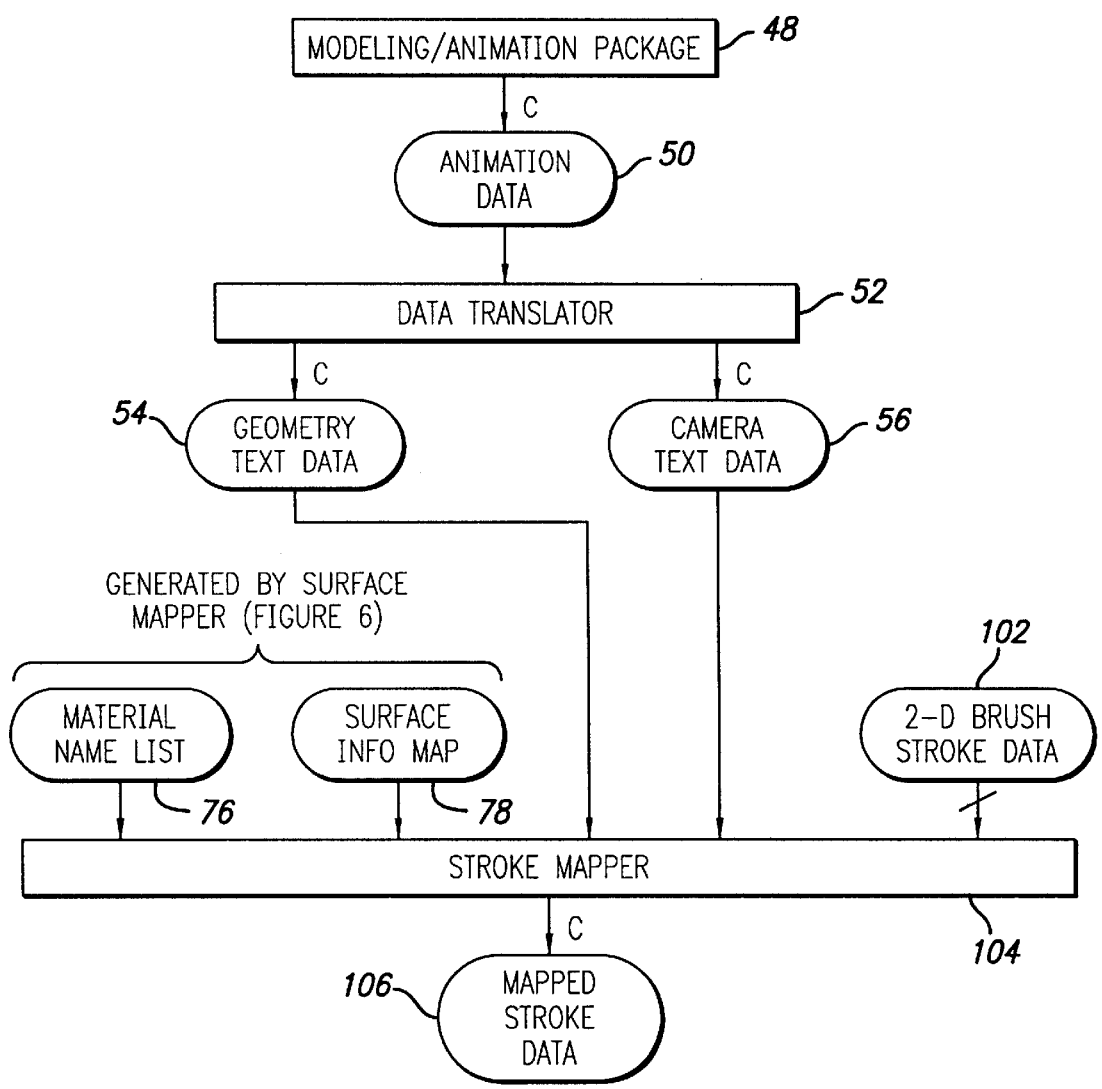
FIG. 8 illustrates the relationship between the input and output files of a stroke renderer according to one embodiment of the present invention.
Figure 12:
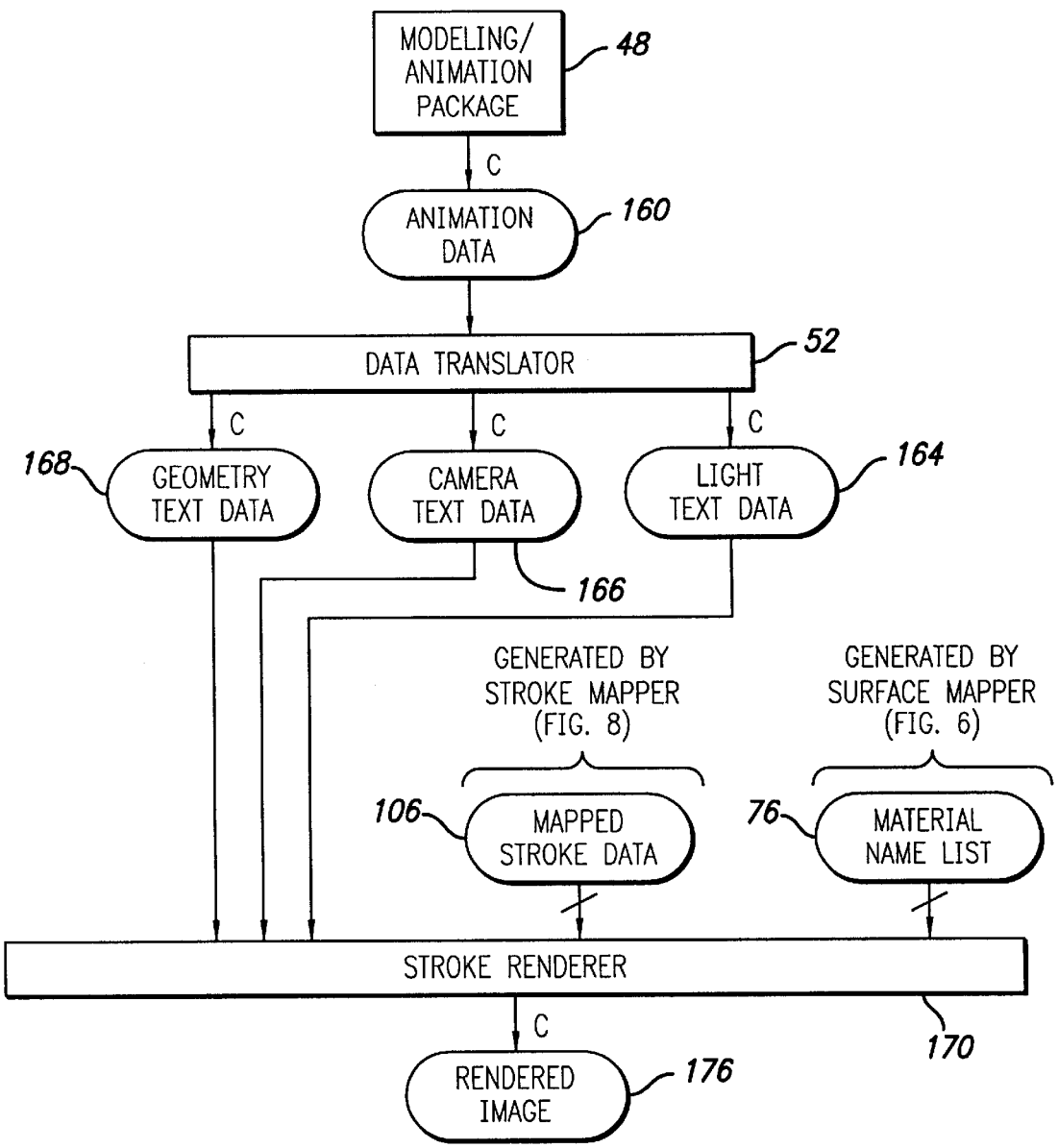
FIG. 12 illustrates the relationship between the input and output files of a stroke renderer according to one embodiment of the present invention.

FIG. 6 is a block diagram of a surface mapper which produces a rendered image of the view selected for painting with the normalized u-v parameters and surface numbers encoded into the rendered pixels. The surface mapper performs the function described at block 40 in FIG. 5. While FIG. 6 illustrates one specific way of implementing the function described at block 40 in FIG. 5, there may be numerous other ways of implementing this function. In FIGS. 6, 8 and 12, a square block denotes an executable file, and an oval block denotes a data file. An arrow "→" indicates the direction of the data flow. A letter "c" denotes creation of file(s) using an executable file(s). A notation "-/-" indicates data from multiple files.

In FIG. 6, the surface mapper is invoked once for each view selected for painting. According to one embodiment of the present invention, the Modeling/Animation Package 48 creates an Animation Data file 50 which contains the camera and geometry information of the view selected for painting. The geometry information consists of parametic representations of 2-D surfaces in 3-D; the parameter variables are u and v. The camera information consists of the camera position and orientation, which are represented by the world-to-camera eye view transformation, and the camera lens and field of view which are represented by the perspective projection transformation. The Data Translator 52 reads in the geometry and camera information from the Animation Data file 50 created by the Modeling/Animation Package 48 and converts the information into text format (54 and 56) for the view selected for painting.

A Material Library Generator 68 extracts from the Geometry Text Data file 54 the names of each surface and the u and v parameter maximum and minimum values. These are stored sequentially in the Material Name List file 76. They are also stored as shading parameters for each surface in the Material Library file 72. The following data exists in the Material Library file for each surface to be rendered:

Shader Name (same for all surfaces);
Shader Type (read by rendering package);
Surface Number;

Minimum u;

Maximum u;

Minimum v;

Maximum v.

Each row in the Material Name List file 76 contains the following data:

Surface Name;

Minimum u;

Maximum u;

Minimum v;

Maximum v, where the number of each row corresponds to the surface number in the Material Library file 72. Thus, the Material Name List file 76 establishes a correspondence between surface names and surface numbers in the Material Library file. An example of an execution sequence of the surface mapper is shown in FIG. 7.

Referring to FIG. 6, the Rendering Package 74 (which may use a commercially available renderer such as RenderMan) renders an image of the view selected for painting at block 16 in FIG. 1. It should be noted that this rendering process is a wireframe rendering process which generates an image of the 3-D model using the geometry information but not the paint information such as brush strokes. Thus, the rendered image of the Surface Information Map 78 is not painted.

The red, green, and blue color components of each pixel in the rendered image are set in the following manner. The red color component of a pixel in the rendered image is set to the normalized number of the surface of the 3-D model hit by that pixel. The green component of the pixel is set to the normalized value of the u parameter at the surface location of the 3-D model hit by that pixel. The blue color component of the pixel is set to the normalized value of the v parameter at the surface location hit by that pixel. The surface number is passed into the Rendering Package 74 from the Material Library 72. This is done via the name-row number correspondence described above.

Normalization of the u and v parameters is performed to fit the values into the color range of 0.0–1.0. This is done using the Minimum u, Maximum u, Minimum v, and Maximum v parameters which are passed in from the Material Library file 72. For u, this is done by subtracting the Minimum u from the Maximum u and dividing the un-normalized u by the result. This is done similarly for v. The surface number is normalized by dividing by one half the color resolution of the file format used. For example, for a 16-bit TIFF format file having a resolution of 16384, a maximum of 8192 surfaces is allowed in a 3-D model. The rendered image in the Surface Information Map 78 is encoded with the normalized u and v parameters and surface numbers.

Stroke Mapper

FIG. 8 illustrates the relationship between the input and output files of a stroke mapper which maps the 2-D stroke points and width vectors to 3-D stroke points and width vectors. It should be noted that this illustrates only one of many ways of performing the stroke mapper. The stroke mapper performs the function described at block 42 in FIG. 5.

A stroke mapper 104 is invoked once for each view selected for painting. It reads in the Geometry Text Data 54, Camera Text Data 56, and the surface map information (i.e., Material Name List 76 and Surface Information Map 78) which were generated by the surface mapper. In addition, the stroke mapper 104 reads in the saved 2-D Brush Stroke Data files 102 created at block 18 in FIG. 1. The stroke mapper 104 generates 3-D brush stroke data which are saved in a Mapped Stroke Data file 106.

The 2-D Brush Stroke Data files 102 contain stroke data of the 2-D brush strokes applied at block 16 in FIG. 1. The 2-D Brush Stroke Data files 102 include stroke data information such as (i) size, color, the degree of opacity, and the degree of softness chosen for each 2-D brush stroke and (ii) the 2-D location (e.g., x-y coordinates) of each 2-D stroke point and the pen pressure at each 2-D stroke point. Each of the 2-D Brush Stroke Data files may contain stroke data of one or more 2-D brush strokes.

A single Mapped Stroke Data file 106 is generated for each view selected for painting.

Stroke Mapper Routine

Figure 9:
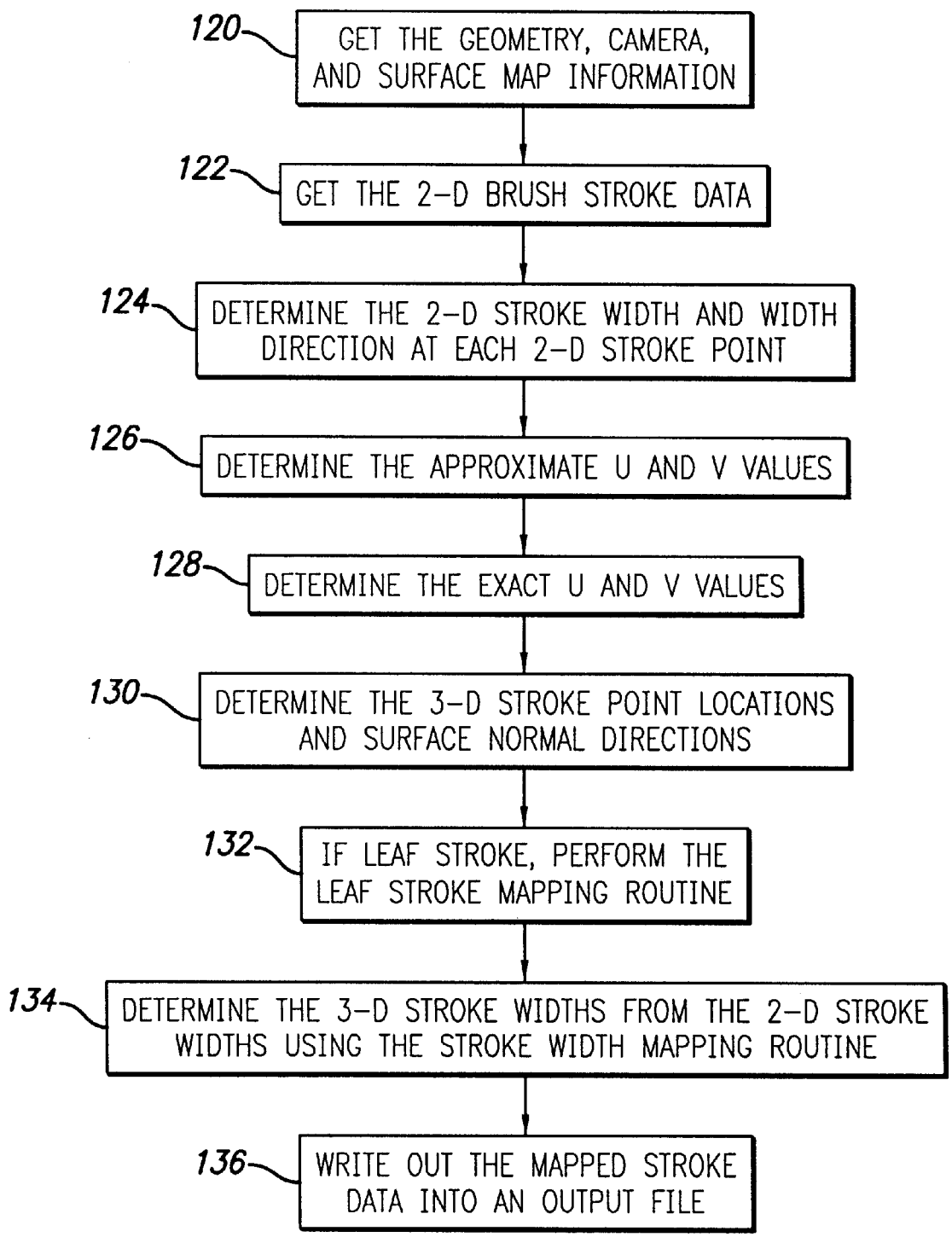
FIG. 9 is a detailed flow chart for a stroke mapper routine according to one embodiment of the present invention.

FIG. 9 is a flow chart for a stroke mapper routine that performs the function described at block 42 in FIG. 5 and which is performed by the stroke mapper 91 in FIG. 8. At block 120, the geometry, camera, and surface map information (e.g., Geometry Text Data 54, Camera Text Data 56, Material Name List 76, and Surface Information Map 78 in FIG. 8) are obtained for the view selected for painting. At block 122, the 2-D brush stroke data (e.g., 2-D Brush Stroke Data files 102) is obtained. At block 124, a 2-D stroke width and a 2-D stroke width direction are determined at each 2-D stroke point, as described above with reference to FIG. 2.

Blocks 126–130 describe the process of mapping the 2-D stroke points obtained at block 122 into 3-D stroke points. The location of each of the 3-D stroke points is determined by ray tracing the corresponding 2-D stroke point along a view vector (e.g., a view vector 224 in FIG. 15) to the point of the first surface hit (e.g., a point 252 in FIG. 15). To speed up and simplify this mapping process, the present invention uses information generated by the surface mapper, which includes (i) a rendered image of the view selected for painting having the normalized u and v parameters and surface numbers encoded into the red, green, and blue components of the rendered pixels (e.g., Surface Information Map 78 in FIG. 6) and (ii) the surface names (e.g., surface names saved in Material Name List 76 in FIG. 6).

At block 126, approximate u and v values of the surface locations of the 3-D model corresponding to the rendered pixels of the view selected for painting are computed using the normalized u and v parameters and surface numbers encoded in the rendered image of the view selected for painting (e.g., the red, green, blue components of each pixel in Surface Information Map 78 in FIG. 6) and surface names and maximum and minimum u and v values (e.g., information in Material Name List 76 in FIG. 6).

The computation of the approximate u and v values from the normalized values is essentially a reverse of the normalization process. First, the surface number is computed by multiplying the normalized value by one half the number of colors per channel (e.g., 8192 for a 16-bit per channel image) and truncating it to the integer value. Second, the surface with this number is looked up in the Material Name List to get the surface name (used below), Minimum u, Maximum u, Minimum v, and Maximum v. Finally, for u, Minimum u is subtracted from Maximum u, and the result is multiplied by the normalized u. A similar operation is done to get the approximate v. These approximate u and v values are accurate within a pixel size.

At block 128, exact u and v values of the surface locations of the 3-D model corresponding to the rendered pixels of the view selected for painting are computed from the approximate u and v values obtained at block 126, using iterative ray tracing. This is done using a standard Newton-Raphson method. The benefit of determining the u and v values in two steps (blocks 126 and 128) is speed.

At block 130, 3-D stroke point locations (e.g., a point 252 in FIG. 15) and their respective surface normal directions (e.g., a vector N 253 in FIG. 15) are determined using the geometry information, exact u and v values, and surface names acquired above. This is done by looking up in the Geometry Text Data the surface with the name found above and evaluating it at the exact u and v to obtain the 3-D stroke point location and surface normal direction.

At block 132, the present invention determines whether a user has specified a 3-D brush stroke to be a "leaf stroke." If it is, then a leaf stroke mapping routine is performed. Leaf strokes and their mapping and displacement routines are described more fully below with reference to FIGS. 22 and 23.

At block 134, a 3-D stroke width and width direction (together, they are referred to as a 3-D stroke width vector) are computed from the 2-D stroke width and width direction (together, they are referred to as a 2-D stroke width vector) at each 3-D stroke point using a stroke width mapping routine which is described more fully below with reference to FIGS. 15–19.

Finally, at block 136, the mapped stroke data is written into an output file (e.g., Mapped Stroke Data 106 in FIG. 8). This output file may contain stroke data information such as (i) size, color, the degree of opacity, and the degree of softness chosen for each 3-D brush stroke and (ii) the 3-D location (e.g., x-y-z coordinates) of each 3-D stroke point and the surface normal direction and 3-D stroke width vector at each 3-D stroke point. FIG. 10 is one exemplary pseudo code for the 3-D mapper routine described in FIG. 9.

Stroke Rendering Process

Now referring to FIGS. 11–14, the stroke rendering process of the present invention as previously mentioned at block 22 in FIG. 1 is described more fully below. It should be noted that, unlike the wireframe rendering process performed at block 14 in FIG. 1, this rendering process involves generating an image of the 3-D model using not only the geometry information but also the paint information such as brush strokes so that the rendered image is painted.

Figure 11:
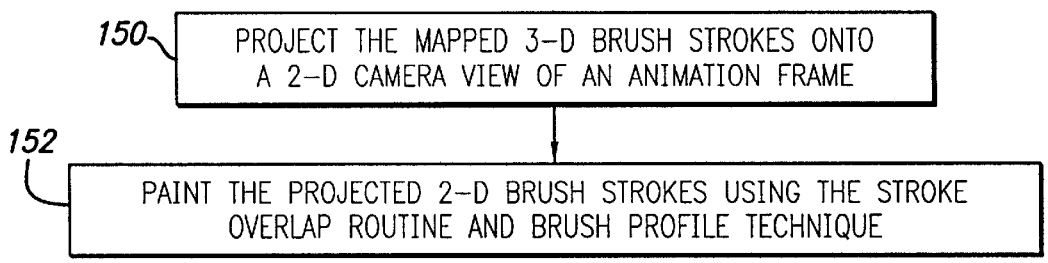
FIG. 11 is a flow chart for a stroke renderer routine.

Now referring to FIG. 11, the stroke rendering process may include two steps according to one embodiment of the present invention. At block 150, the 3-D brush strokes obtained from the 3-D mapper routine in FIG. 9 are projected onto a 2-D view to produce projected 2-D brush strokes. When the present invention is used to paint 3-D objects in an animation film, the 3-D brush strokes are projected onto 2-D camera views of the animation frames. At block 152, the projected 2-D brush strokes are painted using a stroke overlap routine (described more fully with reference to FIGS. 24–28) and the brush implementation technique (described above with reference to FIGS. 2–4).

Stroke Renderer

FIG. 12 illustrates the relationship between the input and output files of a stroke renderer which performs the function described at block 150 in FIG. 11. It should be noted that this illustrates only one of many ways of performing the stroke renderer. In painting objects in an animation film, the stroke rendering process shown in FIG. 12 is invoked once for each animation frame in the animation sequence. According to one embodiment of the present invention, the Modeling/Animation Package 48 creates an Animation Data file 50 which contains the camera, light, and geometry information for each frame of the animation sequence. The Data Translator 52 reads in the camera, light, and geometry information from the Animator Data file 160 and converts the information into text format (e.g., 168, 166, and 164) for each frame of the animation sequence.

A stroke renderer 170 reads in the converted light, camera, and geometry information, the mapped stroke data (e.g., Mapped Stroke Data 106 obtained from the stroke mapper routine), and the surface names (e.g., surface names in Material Name List 76). The stroke renderer 170 then renders a painted view in each animation frame and outputs it into the Rendered Image file 176 which is a bitmap graphic file.

Stroke Renderer Routine

Figure 13:
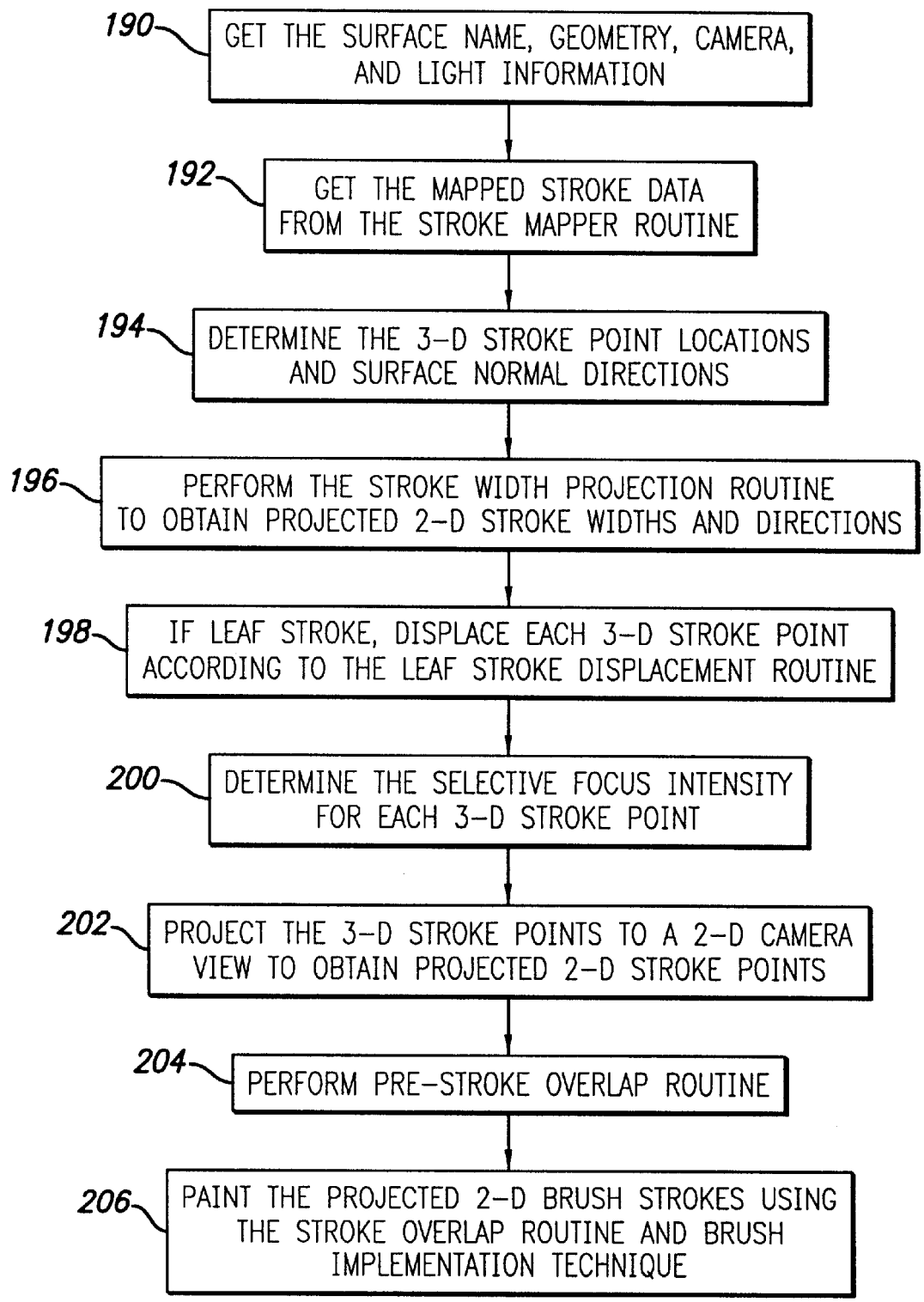
FIG. 13 is a detailed flow chart for the stroke renderer routine.

FIG. 13 is a flow chart for a stroke renderer routine that performs the function described at block 22 in FIG. 1 and which is performed by the stroke renderer 170 in FIG. 12. In painting objects in an animation film, the stroke renderer routine is performed for each animation frame. At block 190, the geometry, camera, light, and surface name information is obtained (e.g., Geometry Text Data 168, Camera Text Data 166, Light Text Data 164, and Material Name List 76 in FIG. 12). At block 192, the mapped stroke data is obtained from the stroke mapper routine (e.g., Mapped Stroke Data 106).

At block 194, the 3-D stroke point locations (e.g., a point 252 in FIG. 15) and their respective surface normal directions (e.g., a vector N 253 in FIG. 15) are determined from the geometry information, the u and v values acquired by the stroke mapper routine, and the surface name, as described below.

Each stroke point datum in the Mapped Stroke Data file has a surface number and the exact u and v values computed by the Stroke Mapper as described above. The surface number is looked up in the Material Name list to get its name. The name is then looked up in the Geometry Text Data and evaluated at the exact u and v to obtain the 3-D stroke point location and surface normal direction.

At block 196, a stroke width projection routine (described more fully with reference to FIGS. 17 and 20–21) is performed to obtain projected 2-D stroke widths and width directions (projected 2-D stroke width vectors).

At block 198, the present invention determines if a 3-D brush stroke is a leaf stroke. If it is, then each of the 3-D stroke points is displaced according to a leaf stroke displacement routine which is described more fully with reference to FIG. 23. At block 200, the selective focus intensity may be determined for each 3-D stroke point. This is described more fully below in the Selective Focus Section. At block 202, the 3-D stroke points are projected onto a 2-D camera view of an animation frame to obtain projected 2-D stroke points.

At block 204, a pre-stroke overlap routine may be performed including: (i) splitting projected 2-D brush strokes where the corresponding 3-D brush strokes wrap around curved edges so that the surface normals of any 3-D brush stroke either all point toward a camera or away from a camera and (ii) assigning sequence numbers to the projected 2-D brush strokes so that the projected 2-D brush strokes are numbered in reverse order if the surface normal directions of corresponding 3-D brush strokes point away from a camera. This ensures correct painter's order (described in detail with reference to FIGS. 24–28) of painting brush strokes when a surface of a 3-D model is turned opposite to the direction from which it was originally painted.

At block 206, the projected 2-D brush strokes are painted using the stroke overlap routine (described in detail with reference to FIGS. 24–28) and the brush implementation technique described above. FIG. 14 is one exemplary pseudo code for the stroke renderer routine described in FIG. 13.

Mapping and Projecting Stroke Width

This section describes (i) how 2-D stroke width vectors are mapped to 3-D stroke width vectors during the 3-D mapping process (block 134 in FIG. 9), (ii) how the distance and angle between the camera and surfaces, the surface movements, and the surface rotations affect the width vectors, and (iii) how the 3-D stroke width vectors are projected onto a 2-D view to produce projected 2-D stroke width vectors during the stroke rendering process (block 196 in FIG. 13).

During the 3-D mapping process, the present invention synthesizes 3-D brush strokes so that the projected 2-D brush strokes look the same as the original painted 2-D brush strokes when the projected 2-D brush strokes are viewed in the frame in which the original 2-D brush strokes were painted. To achieve this goal, the present invention generates appropriate 3-D stroke width vectors from the 2-D stroke width vectors as described below.

Stroke Width Mapping Process

Figure 15:
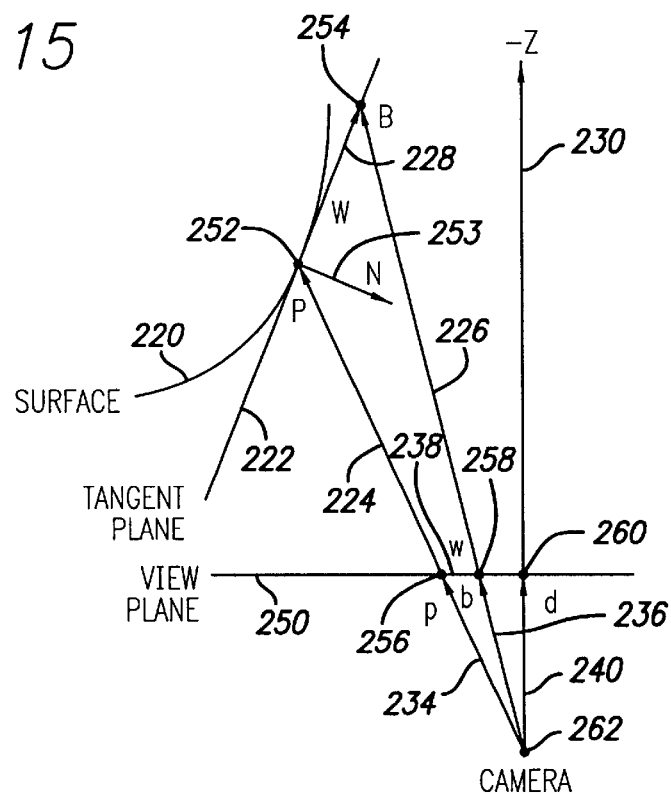
FIG. 15 illustrates reverse projecting stroke width vectors from 2-D space to 3-D space according to one embodiment of the present invention.
Figure 16:
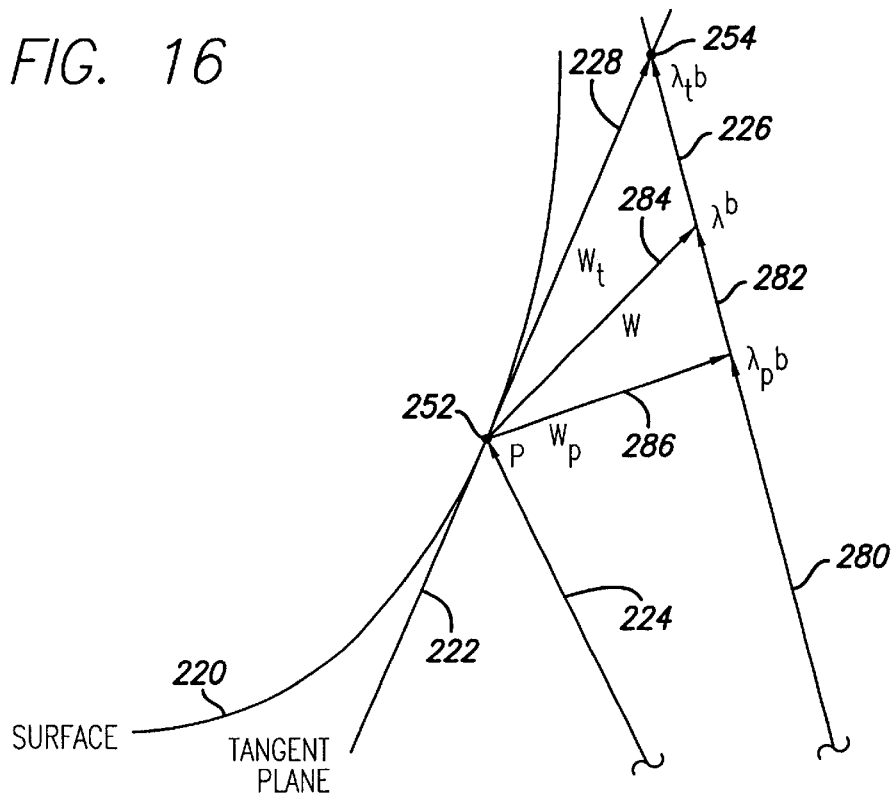
FIG. 16 illustrates how the length of a stroke width vector can be limited according to one embodiment of the present invention.

FIGS. 15 and 16 illustrate how a 3-D stroke width vector is obtained according to one embodiment of the present invention. In FIG. 15, a 2-D stroke point 256 on a view plane 250 has a 2-D stroke width vector w 238 whose length is obtained from the size of the corresponding 2-D brush stroke (not shown) and the pen pressure at the 2-D stroke point 256 and whose direction is perpendicular to its corresponding 2-D stroke segment (not shown). This method of determining a 2-D stroke width vector was described above with reference to FIG. 2.

The 2-D stroke point 256 is mapped to a 3-D stroke point 252 on a surface 220 by ray tracing the 2-D stroke point 256 along a view vector P 224. The 3-D stroke point 252 has a surface normal vector N 253, originating at the 3-D stroke point 252.

To determine a 3-D stroke width vector W 228, a vector B 226 needs to be determined. Vector B 226 is the vector b 236 scaled by a factor $\lambda$, where $\lambda$ is a number large enough to bring the vector b 236 into the tangent plane 222. An expression for W can be obtained in the following way:

$$W=B-P.$$

Since $B=\lambda b$:

$$W=\lambda b - P.$$

W, however, needs to be limited to a maximum size if N is almost normal to P. This is shown in FIG. 16. $W_t$ is the original width vector in the tangent plane calculated above. $\lambda_t b$ is the corresponding view vector to the end point of $W_t$. $\lambda_p$ may be defined such that $\lambda_p b$ has the same length as P. This creates a width vector $W_p$ which is perpendicular to a view vector to the point mid-way between P and $\lambda_p b$. $W_p$ is the shortest width vector possible and is a good stating point for determining a maximum-length of W. The value of $\lambda$ and the corresponding W whose length is limited are determined as follows:

$$|W|=f|W_p|$$

where f is some multiplying factor (e.g., 2). Solving for $\lambda_p$, the following is obtained:

$$\lambda_p = |P|/|b|$$

Substituting for $W_p$ and defining l as the desired length of W, the following is obtained:

$$l = f|\lambda_p b - P|$$

Now solving for $\lambda$ by expressing the length of W in terms of it:

$$|\lambda b - P| = l$$

This gives the quadratic $$|b|^2 \lambda^2 - 2(b \cdot P)\lambda + |P|^2 = l^2$$

which has the two solutions:

$$\lambda = \frac{b \cdot P}{|b|^2} \pm \frac{l}{|b|^2}\sqrt{|b \cdot P|^2 - |b|^2(|P|^2 - l^2)}$$

The correct solution of the two is the one where $\lambda b$ is between $\lambda_p b$ and $\lambda_t b$ because this is the one which brings the width vector closer to the surface 220.

Effect of Surface Movements Relative to Camera on Stroke Width

The changes in surface location and orientation relative to the camera between the view selected for painting and the views in the animation frames must be taken into account when mapping and projecting stroke width vectors. Such changes can be caused by movements in world coordinates of both the surface being viewed and the camera. Movements of the camera are accounted for by the world-to-camera eye view transform (matrix). To account for surface movement, the 3-D stroke width vector computed for a view selected for painting is initially mapped into an x-y-z coordinate system which is invariant under such surface positional changes.

Such a coordinate system is created by taking the cross product of the surface normal with the surface derivative in u, which are orthogonal to each other. The resulting vector is orthogonal to the other two, creating an orthogonal coordinate system. These three vectors are then normalized to create the axes of an orthonormal coordinate system. The 3-D stroke width vector is then expressed in this coordinate system by taking its dot product with each axis. Thus, if $P_p$ is the 3-D stroke point location, $N_p$ is the surface normal at $P_p$, and $W_p$ is the 3-D stroke width vector at $P_p$, all expressed in the world coordinates of the view selected for painting, then the coordinates in the invariant system are given by:

$$x_l = W_p \cdot \left(\frac{dP_p}{du}\right)_n$$

$$y_l = W_p \cdot \left(N_p \times \frac{dP_p}{du}\right)_n$$

$$z_l = W_p \cdot (N_p)_n$$

where the subscript n indicates normalization of the quantity in the associated parentheses.

To obtain the value of the 3-D stroke width vector in the world coordinates of an animation frame, the same three coordinate axes for the animation frame need to be computed. These vectors may have a different position and orientation relative to the camera view of the animation frame than they did relative to the camera view selected for painting. However, since they are invariant relative to the surface orientation at a 3-D stroke point P, if each new axis is multiplied by the corresponding components computed above and the resulting vectors are added, then one will obtain the 3-D stroke width vector in world coordinates of the animation frame. Thus, if $P_a$ is the 3-D stroke point location, $N_a$ the surface normal at $P_a$, and $W_a$ is the 3-D stroke width vector at $P_a$, all expressed in animation frame world coordinates, the 3-D stroke width vector is expressed as follows:

$$W_a = x_l \left(\frac{dP_p}{du}\right)_n + y_l \left(N_a \times \frac{dP_p}{du}\right)_n + z_l (N_a)_n$$

where the subscript n indicates normalization of the quantity in the associated parentheses.

In each case above the u surface derivative and surface normal are evaluated from the geometry information.

Effect of Surface Orientation Relative to Camera on Stroke Width

Now referring to FIG. 17, the effect of camera movements between a view selected for painting and views in the animation frames needs to be considered. Two 2-D stroke points $P_1$ and $P_2$ have a 2-D stroke segment 300 and a 2-D stroke width vector W 302 in a view selected for painting. The 2-D stroke width vector W 302 is perpendicular to the 2-D stroke segment 300 in this original view. However, if the 2-D stroke width vector W is mapped to a 3-D stroke width vector and then projected using a view which, due to camera movement, is rotated from the original view, then the projected 2-D stroke width vector W 306 may no longer be perpendicular to its projected 2-D stroke segment 304. To resolve this problem, the present invention re-aligns the projected 2-D stroke width vector W 306 and generates a new projected 2-D stroke width vector $W_n$ 308 so that $W_n$ 308 is perpendicular to the projected 2-D stroke segment 304. $W_n$ 308 is a component of W 306 that is perpendicular to the projected 2-D stroke segment 304. $W_n$ is the correct indication of the width of the stroke segment in the new view, i.e., the stroke segment has become narrower because it has turned away from the camera.

Stroke Width Mapping Routine

Now referring to FIGS. 18 and 19, the stroke width mapping routine, which is used at block 134 in FIG. 9, is described according to one embodiment of the present invention. The stroke width mapping routine is used to map 2-D stroke width vectors to 3-D stroke width vectors. At block 320 in FIG. 18 and lines 3–16 in FIG. 19, the 2-D stroke points are mapped onto the camera eye coordinates. A camera eye coordinate system is shown in FIG. 15, where the origin (0,0,0) of the camera eye coordinate system is at the camera 262. At block 322 and lines 19–33 in FIG. 19, 3-D stroke width vectors are synthesized from 2-D stroke width vectors using the technique of limiting the size of the 3-D stroke width vectors as described with reference to FIGS. 15–16 and the technique of mapping the 3-D stroke width vectors into coordinates which are invariant under surface movements relative to the camera, as described in the section on the Effect of Surface Movements Relative to Camera on Stroke Width.

Stroke Width Projection Routine

Figure 20:
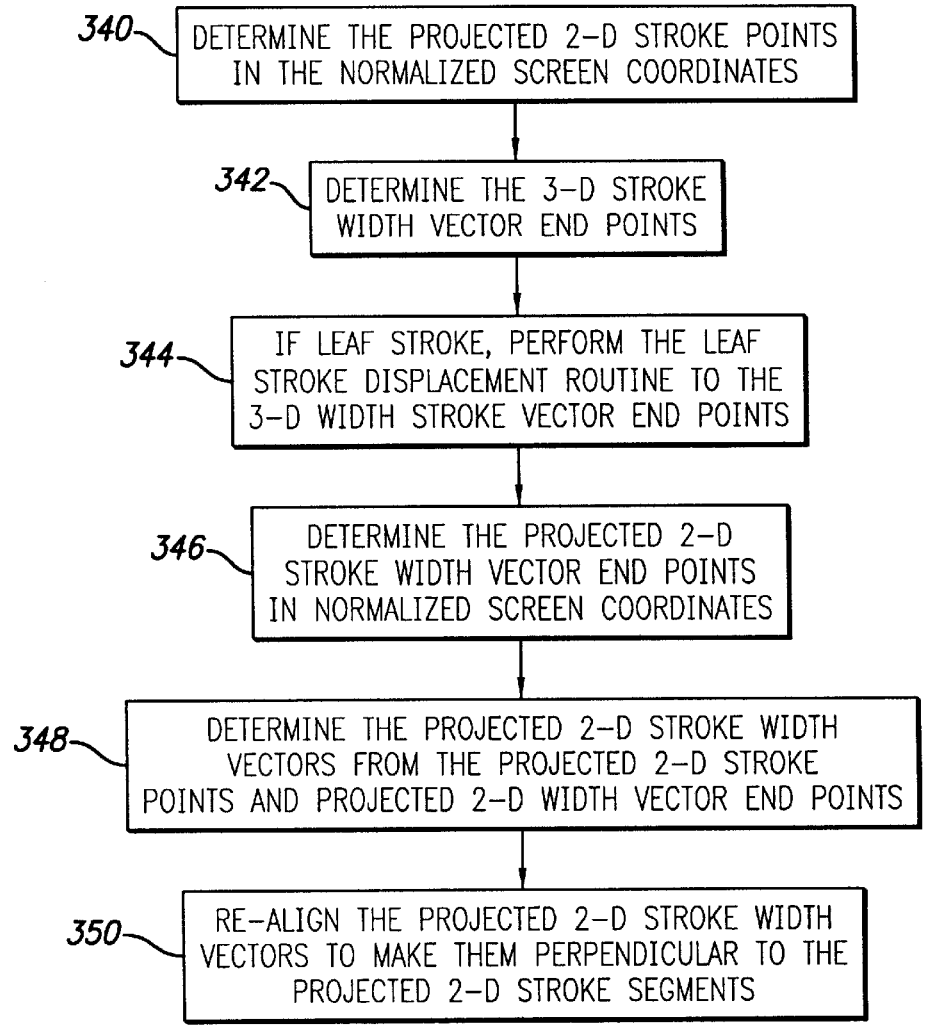
FIG. 20 is a flow chart for a stroke width projection routine according to one embodiment of the present invention.

Now referring to FIGS. 20 and 21, the stroke width projection routine, which is used at block 196 in FIG. 13, is described according to one embodiment of the present invention. The stroke width projection routine is used to generate projected 2-D stroke width vectors from 3-D stroke width vectors. The routine is invoked once for each animation frame. At block 340 in FIG. 20 and lines 3–16 in FIG. 21, projected 2-D stroke points in the normalized screen coordinates of an animation frame are obtained from the 3-D stroke prints and surface normal directions.

At block 342 in FIG. 20 and lines 20–24 in FIG. 21, the 3-D stroke width vector end points are determined by adding the 3-D stroke point vectors to the 3-D stroke width vectors. For example, in FIG. 15, a 3-D stroke width vector end point 254 is obtained by adding the 3-D stroke point vector P 224 to the 3-D stroke width vector W 228.

At block 344 in FIG. 20 and lines 25–26 in FIG. 21, if the 3-D brush stroke is a leaf stroke, then the leaf stroke displacement routine (described in detail with reference to FIG. 23) is performed to the 3-D stroke width vector end points. At block 346 in FIG. 20 and lines 27–32 in FIG. 21, projected 2-D stroke width vector end points are obtained by transforming the 3-D stroke width vector end points into the projected 2-D stroke width vector end points. At block 348 in FIG. 20 and lines 33–36 in FIG. 21, projected 2-D stroke width vectors are obtained from the projected 2-D stroke points and projected 2-D width vector end points.

Finally, at block 350 in FIG. 20 and lines 37–38 in FIG. 21, the projected 2-D stroke width vectors are re-aligned to account for camera movements as described above so that the re-aligned 2-D stroke width vectors are perpendicular to their respective projected 2-D stroke segments. FIG. 21 is one exemplary pseudo code for the stroke width projection routine described in FIG. 20.

Leaf Stroke

Leaf strokes are different from ordinary brush strokes in that, after leaf strokes are mapped from 2-D space onto 3-D space, the leaf strokes are displaced by a random amount and rotated by a random amount so that the strokes can move and fill the volume near the surface to which they are mapped in 3-D space. This allows an artist to paint leaves in a natural way using a 3-D surface which indicates only the approximate location of the leaf mass.

Detecting Leaf Strokes

Leaf strokes are delimited so that the beginning and end of a sequence of strokes which correspond to a single leaf can be determined. The present invention utilizes the following delimiters. First, a Stroke Leaf Start indicator may be used. When this indicator is received, each subsequent stroke is interpreted as a separate leaf. A new random position and orientation offset are assigned to each leaf stroke to indicate that it is a separate leaf.

Second, a Group Leaf Start indicator may be used. When this indicator is received, the present invention assigns the same random offset in position and orientation to each subsequent brush stroke until another Group Leaf Start indicator is received, a Stroke Leaf Start indicator is received, or a Leaf Stop indicator (described below) is received.

Third, a Leaf Stop indicator may be used. When this indicator is received, the present invention resumes the normal mapping and rendering process without leaf offsets.

Leaf Stroke Mapping and Displacing

A leaf stroke mapping and displacing process is a randomization technique that displaces leaf strokes by random amounts in random directions to create a mass of leaves. It should be noted that this is only one possible displacement technique. Other deterministic techniques such as displacing brush strokes based on stroke color or stroke number can be used. Or a combination of random and deterministic techniques can be used.

In painting leaves traditionally, an artist usually paints a bunch of leaves—depicting some leaves as being turned in which case he/she paints them narrower than the actual size and depicting some leaves as forward-facing him/her in which case he/she paints them in their actual size. In the present invention, when an artist paints brush strokes as leaf strokes, he/she needs to paint them as if the leaves are forward-facing him/her. The present invention then displaces the forward-facing leaves by random amounts and rotates them to random angles to produce a mass of leaves.

If a brush stroke is a leaf stroke, it is mapped into a plane parallel to the view plane in 3-D space (e.g., a plane parallel to a view plane 250 in FIG. 15) because a leaf stroke is painted in the forward-facing direction as described above. An ordinary brush stroke, on the other hand, is mapped into a local surface tangent plane (e.g., a tangent plane 222 in FIG. 15).

Mapping a leaf stroke into a plane parallel to the view plane is not straightforward for the following reasons. First, every 3-D stroke point of a leaf stroke needs to be moved to a plane which goes through a pivot point. This pivot point may be established using any 3-D stroke point of the leaf stroke. A convenient pivot point may be the first 3-D stroke point of a leaf stroke which is the first 3-D stroke point encountered after a Leaf Start indicator is detected. Second, the location of this point can change if the surface to which the leaf stroke is mapped is animating. Finally, unlike surface tangent plane information, this plane's orientation is not readily available in the animation frames and must be regenerated.

Figure 22:
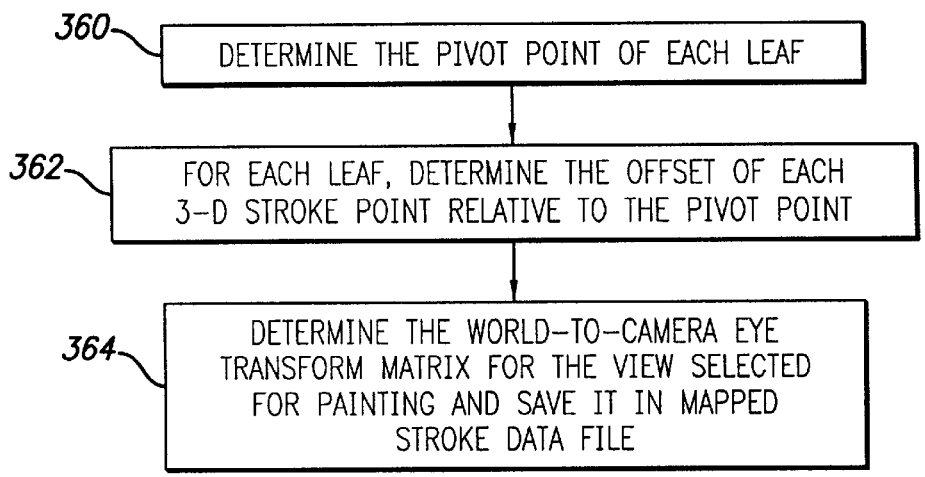
FIG. 22 is a flow chart for a leaf stroke mapping routine according to one embodiment of the present invention.

The process of mapping a leaf stroke into a plane parallel to the view plane includes the following steps. First, a leaf stroke mapping routine is performed which is shown in FIG. 22. This routine is performed during the 3-D mapping process, e.g., block 132 in FIG. 9. Referring to FIG. 22, at block 360, a pivot point (e.g., the first 3-D stroke point of the first leaf stroke of a leaf) is determined for each leaf. It should be noted that a leaf refers to a whole leaf rather than a single leaf stroke so that a leaf typically consists of multiple leaf strokes. Then at block 362, the offset relative to the pivot point is determined for each 3-D stroke point of each leaf stroke of the leaf, in the z direction in the camera eye coordinates (e.g., a direction 230 in FIG. 15). This offset is computed for each 3-D stroke point by subtracting the z component of the pivot point from the z component of the 3-D stroke point in the camera eye coordinates.

If this offset amount is subtracted from the z component of the camera eye coordinate of the 3-D stroke point, then the 3-D stroke point is brought into a plane going through the pivot point which is parallel to the view plane. While this offset is accurate enough for most purposes, if a more exact offset is desired, then it is determined along a view vector rather than in the z direction. Finally, at block 364, the world-to-camera eye transform matrix is determined for each view selected for painting and is saved in the corresponding Mapped Stroke Data file.

Figure 23:
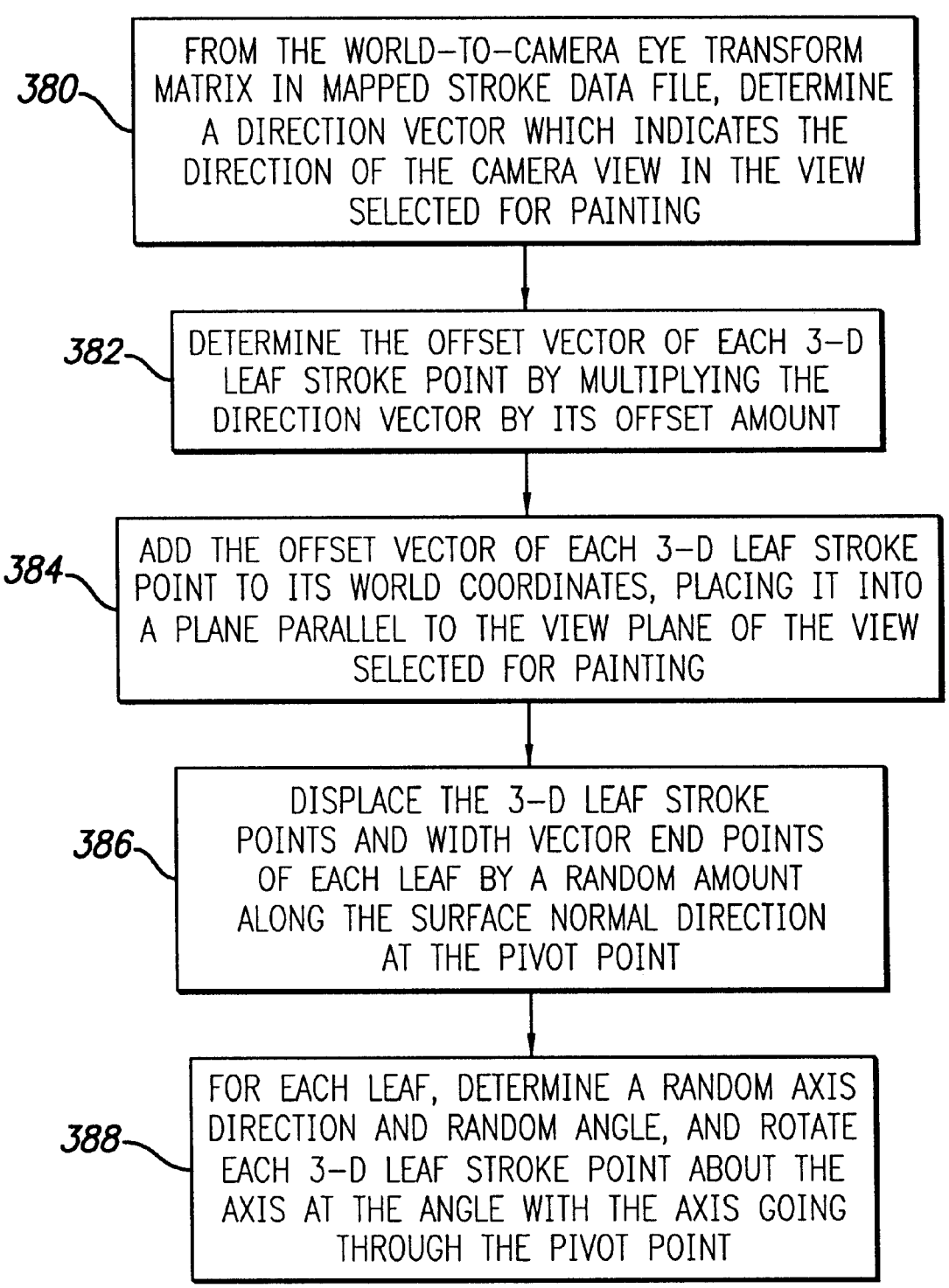
FIG. 23 is a flow chart for a leaf stroke displacement routine according to one embodiment of the present invention.

Second, the first part of the leaf stroke displacement routine (i.e., blocks 380, 382 and 384 in FIG. 23) is performed. This routine is performed during the stroke rendering process, e.g., block 198 in FIG. 13. Referring to FIG. 23, at block 380, a direction vector is determined which indicates the direction of the camera view in the view selected for painting. This can be accomplished by mapping a unit vector from the z-axis in the camera eye coordinates to the world coordinates as follows:

The world-to-camera eye transform matrix is read in from the Mapped Stroke Data file. Then it is inverted, and its rotational component is extracted. This matrix is then applied to a unit vector along the z axis to get the camera eye view z axis unit vector expressed in world coordinates. This is the required direction vector.

At block 382, an offset vector is determined by multiplying the direction vector by the offset amount computed at block 362 in FIG. 22. At block 384, the offset vector is added to the 3-D stroke points of the leaf stroke to place the 3-D stroke points of the leaf stroke into a plane parallel to the view plane.

After the 3-D stroke points of the leaf stroke are mapped into a plane parallel to the view plane, the second part of the leaf stroke displacement routine may be performed, which are shown as blocks 386 and 388 in FIG. 23. At block 386, for each leaf, a random displacement amount is determined. Then, each 3-D stroke point of the leaf is displaced by this amount, in the direction of the surface normal at the pivot point (e.g., a surface normal N 253 in FIG. 15) at a location on the surface where the leaf stroke is mapped. The size of the displacement is random, and the displacement can be made in either direction along the surface normal. The amount of the random displacement may be limited to a selectable maximum amount.

At block 388, each of the 3-D stroke points and the corresponding 3-D stroke width vector of the leaf stroke are rotated to a random angle. For each leaf, a random axis orientation and rotation angle are determined. Then, each 3-D stroke point of the leaf is rotated about this axis at this angle, with the axis going through the pivot point. The amount of the random rotation may be limited to a selectable maximum amount.

Selective Focus

Selective focus is a painting style where certain areas are emphasized and others are de-emphasized. The emphasized or focus areas tend to have more contrast and saturated color, whereas the remaining areas tend to have more muted colors, often transitioning to a background or atmospheric color.

The present invention uses the following procedures to perform the selective focus:

1. In painting a scene, the entire scene is painted as if it were a focus area. This is done because the focus areas have the greatest information, and the focus areas can be easily turned into non-focus areas by simply removing certain information.

2. Selective focus areas are represented by objects during the 3-D modeling step (e.g., block 10 in FIG. 1). This simplifies their specification as 3-D regions.

3. That an object is a selective focus object is indicated either by its name or by assigning a specific object type to it (e.g., point light source).

4. A selective focus object is characterized with the following parameters: the location of the focus center, intensity, and width.

Intensity is the amount of emphasis given to a stroke point that is at the center of a selective focus object. If this is maximum, the stroke points close to the focus center look identical to how they were painted. If it is less than maximum, the stroke points receive a corresponding amount of de-emphasis, even though they are at the focus center.

Width is the rate of fall-off of emphasis from the intensity value at the focus center. If there is some de-emphasis at the focus center already because the intensity is less than maximum, this de-emphasis is increased even more in proportion to the distance from the focus center. If width is large, the rate of fall-off is small and even stroke points far from the focus center are emphasized almost as much as those close to the focus center.

De-emphasis Operation

The de-emphasis operation uses the selective focus object parameters mentioned above to de-emphasize stroke points based on their distance from the focus center. In effect, the de-emphasis operation modifies the brush strokes so that strokes' appearance as painted is "toned down" in proportion to their distance from the focus center. The operation modifies the brush strokes to simulate atmospheric and other effects in order to direct attention to the focus center. The following formula is used to compute the emphasis each stroke point receives:

$$\min\left(\sum_i i_i \exp\left(\left(\frac{-d_i}{Dw_i}\right)^2\right), i_{\max}\right)$$

where the summation is over the focus objects; $i_i$ is the intensity of the focus object; $d_i$ is the distance from the stroke point to the focus center; $w_i$ is the width of the focus object; and $i_{max}$ is the maximum intensity which causes complete focus. The formula clamps the maximum value of the focus to the value $i_{max}$. The normalizing factor D is an estimate of the diagonal size of the area being viewed (e.g., bounding box diagonal) at a distance from the camera where most of the interest is. The above formula may be modified if necessary in order to improve the look of the selective focus.

The effect of multiple focus objects is additive. For example, if a stroke point is equal distance from the focus centers of two focus objects with identical widths and intensities, it doubles the emphasis it would have if only one of the focus objects were present.

The effect of the de-emphasis operation may involve varying the values of the color, hue and/or saturation. If necessary for a desired look, it may also affect other brush stroke parameters such as stroke width, opacity, and softness.

Selective focus values are interpolated along each projected 2-D stroke segment in the same manner as other attributes defined at stroke points, as described in the Brush Implementation Technique section.

Stroke Overlap Technique

Figure 24:
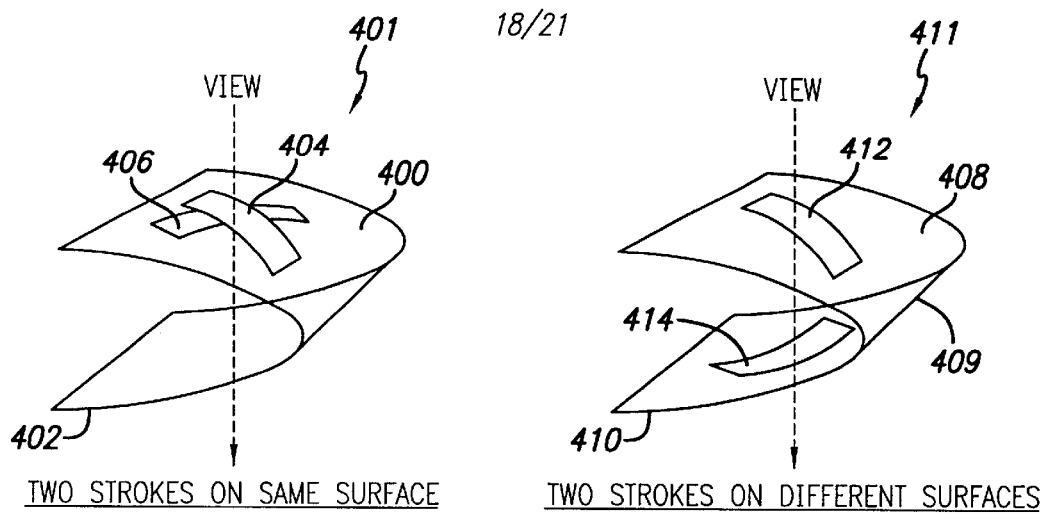
FIG. 24 illustrates brush strokes that are on the same surface and on different surfaces.

Now referring to FIGS. 24–26, a stroke overlap technique, which was discussed with reference to block 152 in FIG. 11 and block 206 in FIG. 13, is described in detail. In FIG. 24, two brush strokes may overlap in two ways: (i) two brush strokes 404 and 406 may overlap because they were actually painted on top of each other on the same surface (situation 401 in FIG. 24) and (ii) two brush strokes 412 and 414 may overlap because they were actually painted at some distance from each other but are brought into juxtaposition by the view (situation 411 in FIG. 24).

In situation 401 in FIG. 24, the brush strokes 404 and 406 are characterized as being on the same surface 400, meaning they are on the same local surface. In situation 411, the brush strokes 412 and 414 are characterized as being on different surfaces 408 and 410, even though they may be on the same physical surface 409.

The stroke overlap technique of the present invention uses the following procedures in painting overlapping brush strokes.

1. When two overlapping brush strokes are on the same surface (situation 401 in FIG. 24), they are painted in painter's order, which means the brush stroke painted last by an artist is painted on top.

2. When two overlapping brush strokes are on different surfaces (situation 411 in FIG. 24), they are painted in depth order, which means the brush stroke that is closer to the camera is painted on top, irrespective of the order in which they were painted by the artist.

3. When surfaces move relative to the camera, the painting order may change, which may cause a pop. It should be noted that in the present invention, because the brush strokes do not conform accurately to the surfaces to provide the painterly look, the painting order may change even if the surfaces do not physically move relative to each other. The corners of two brush strokes can move relative to each other if the underlying surface rotates. In order to avoid the popping problem mentioned above, the present invention may blend the two priority orders mentioned above to provide a smooth transition between the painter's order and depth order.

Color Blending

Figure 25:
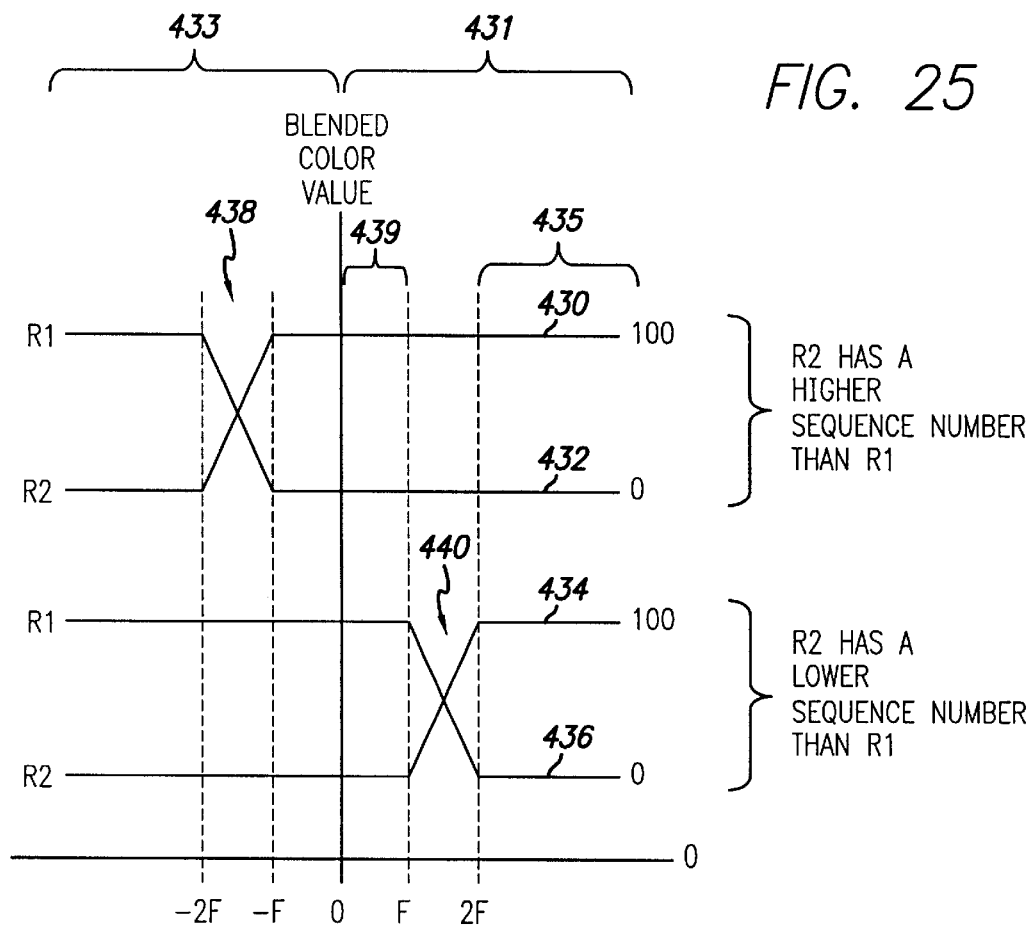
FIG. 25 illustrates how the colors of two brush strokes are blended.

FIG. 25 illustrates how the present invention determines the painting order and the blended color value using a "feature size." Assume that there are two brush strokes R1 and R2, that a distance D represents the amount of distance that a stroke point of brush stroke R2 is in front of a stroke point of the brush stroke R1 at a given pixel, and F is the feature size. The vertical axis in FIG. 25 indicates the blended color value.

As discussed above, the present invention's brush strokes do not conform accurately to the surface geometry in order to provide the painterly look. As a result, there may be a situation where the two brush strokes cannot be determined to be on the same surface or different surfaces. To solve this problem, the present invention defines a feature size. When the distance between the brush strokes is less than one feature size in the z direction, the brush strokes are assumed to be on the same surface, and the painter's order is used. When the distance between the brush strokes are more than two feature sizes, the brush strokes are assumed to be on different surfaces, and the depth order is used.

There is no precise technique for determining a feature size which works in all cases. A highly robust technique used in the present invention is as follows. When evaluating two brush strokes for overlap, a maximum diagonal is computed for each brush stroke. The maximum diagonal of a brush stroke is the largest diagonal of any stroke segment of the brush stroke. The diagonal of a stroke segment is given by:

$$d = \sqrt{|P_1 - P_2|^2 + 30|W|^2}$$

where $P_1$ and $P_2$ are the stroke points of the stroke segment and W is the stroke width vector at $P_2$.

If $d_{m1}$ and $d_{m2}$ are the maximum diagonals of the two brush strokes, then the feature size F is defined as:

$F = d_{m1} + d_{m2}$

This technique works because stroke segments are normally smaller than the objects on which they are painted. Also, brush strokes have fairly uniform segment sizes. Thus, if two stroke segments are farther apart than the sum of the maximum stroke segment diagonals, they tend to be on different surfaces. If they are closer together than this, they tend to be on the same surface.

Distance between stroke points of two overlapping brush strokes affecting a pixel, which is shown as D in FIG. 25, is determined as follows. If a new brush stroke (e.g., R2) is about to be painted into a pixel which already has a color of a previous brush stroke (e.g., R1) at that pixel, then the distance D is computed by subtracting the z-component of the camera eye coordinates of a terminating stroke point of the stroke segment of R1 affecting the pixel from a corresponding z-component of the terminating stroke point of the stroke segment of R2 affecting the pixel. How a pixel is affected by the various parameters associated with stroke points, a stroke segment, and a brush stroke is described in detail in the Brush Implementation Technique section.

Curve 430 represents the percentage of the pixel color of the brush stroke R2 being applied, when R2 has a higher sequence number than R1, meaning R2 was painted after R1. Curve 432 represents the percentage of the pixel color of the brush stroke R1 being applied, when R2 has a higher sequence number than R1. Curve 434 represents the percentage of the pixel color of the brush stroke R2 being applied, when R2 has a lower sequence number than R1, meaning R2 was painted before R1. Curve 436 represents the percentage of the pixel color of the brush stroke R1 being applied, when R2 has a lower sequence number than R1.

A region 431 represents the situation where the brush stroke R2 is closer to the camera than R1. A region 433 represents the situation where the brush stroke R1 is closer to the camera than R2.

When the brush strokes at a pixel are more than two feature-size apart, they are painted in depth order. For example, in a region 435, where R2 is closer to the camera than R1, and R1 and R2 are more than two feature-size apart, the depth order is used. The colors of R1 and R2 are blended to produce a composite color at the pixel using the color composition operation described in the Brush Implementation Technique section. In this example, the blended color value of R1 is zero. When this blended color value is applied to the color composition operation, e is zero, and $C_{cmp} = C_{R2} + (1 - A_{R2}) * C_{R1}$, where $C_{R2}$ is the pixel color of R2 at this pixel, $A_{R2}$ is the Alpha value of $C_{R2}$, and $C_{R1}$ is the pixel color of R1 at this pixel.

When the brush strokes at a pixel are less than one feature-size apart, they are painted in painter's order. For example, in a region 439, R1 and R2 are less than one feature-size apart. When R2 has a higher sequence number (top portion of the region 439), R1 is painted first. The colors of R1 and R2 are blended to produce a composite color at the pixel in the following manner. In this example, when the blended color value of R1 which is zero is used, e is zero, and $C_{cmp} = C_{R2} + (1 - A_{R2}) * C_{R1}$.

When the brush strokes at a pixel are less than two feature-size apart but more than one feature-size apart, the blended color values are as shown in regions 438 and 440. The example shown in FIG. 25 uses a linear transition curve in these regions. This may be replaced by some higher order function if necessary to ensure a smooth transition. In the region 438, the composite color of R1 and R2 at the pixel is $C_{cmp} = (1 - e * A_{R1}) * C_{R2} + (1 - (1-e) * A_{R2}) * C_{R1}$, where e may depend on the blended color value of R1 and vary from zero to one.

Stroke Overlap Routine

Figure 26:
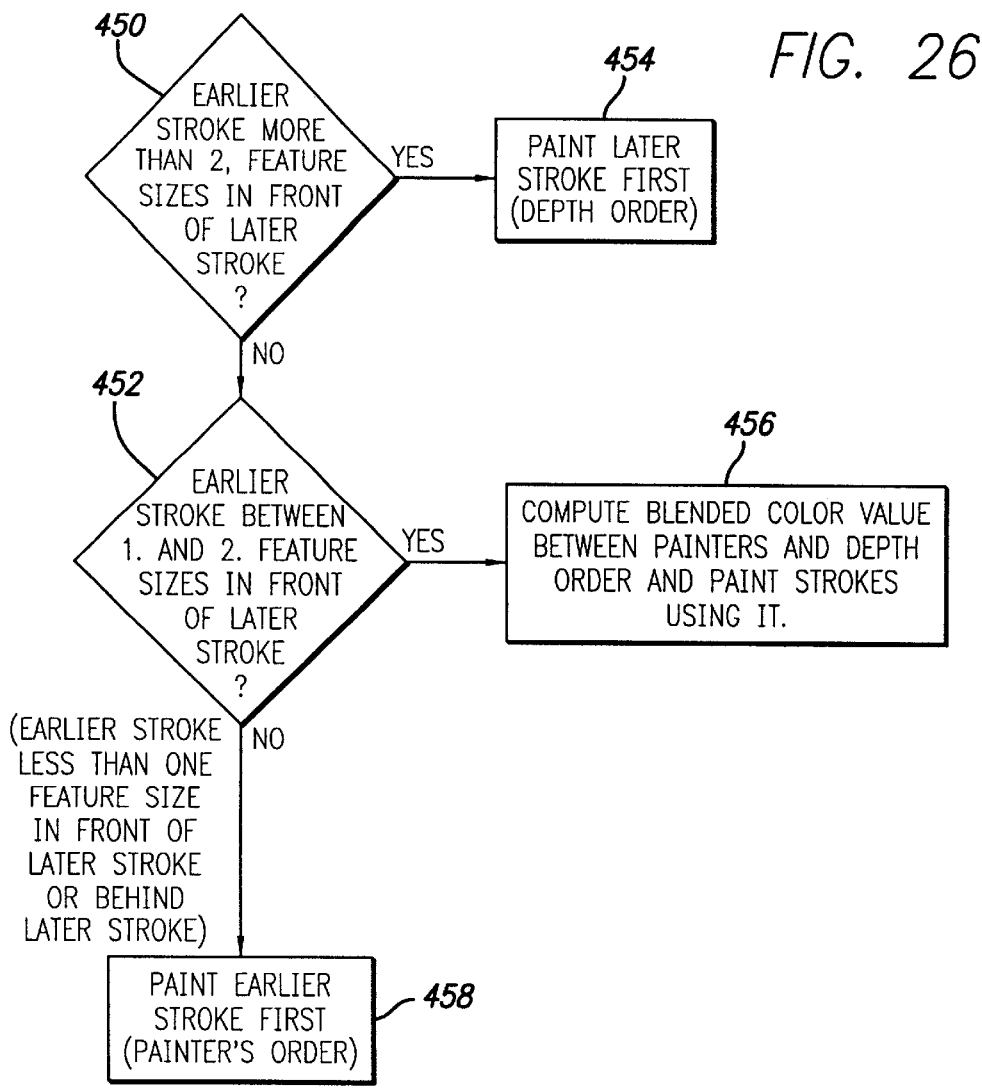
FIG. 26 is a flow chart for a stroke overlap routine according to one embodiment of the present invention.

FIG. 26 is a flow chart for a stroke overlap routine that implements the procedures described above. At block 450, the present invention determines at a given pixel whether a terminating stroke point of a stroke segment of a brush stroke, affecting the pixel, that was painted by an artist earlier (earlier stroke) is closer to the camera than a terminating stroke point of a stroke segment of another brush stroke, affecting the same pixel, that was painted by the artist later (later stroke) by more than two feature sizes. If it is, then the brush strokes at the pixel are painted in depth order (block 454). In such a case, to determine the composite color at the pixel, the pixel colors of the two brush strokes are blended using (i) a blended color value for the depth order (e.g., the blended color value of R1 in the region 435 in FIG. 25, which is zero) and (ii) the color composition operation described in the Brush Implementation Technique section.

If the stroke point of the earlier stroke is not closer to the camera by more than two feature sizes, then the present invention determines whether the stroke point of the earlier stroke is closer to the camera than that of the later stroke by one to two feature sizes (block 452). If it is, then at block 456, a blended color value is computed (e.g., a blended color value of R1 in the region 440 in FIG. 25 which depends on the value of D), and then the composite color is determined using the computed blended color value and the color composition operation.

If neither block 450 nor block 452 applies (the stroke point of the earlier stroke is closer to the camera than that of the later stroke by less than one feature size or is behind that of the later stroke), then the brush strokes are painted in painter's order (block 458). To determine the composite color at the pixel, the pixel colors of the two brush strokes at the pixel are blended using (i) a blended color value of the painter's order (e.g., the blended color value of R1 in the bottom portion of the region 439 in FIG. 25, which is one hundred) and (ii) the color composition operation.

Brush strokes which are on opposite sides of a curved surface when viewed from the camera may be difficult to blend correctly due to their close proximity. The brush stroke facing away from the camera (i.e., the back-facing brush stroke) will always be behind the forward-facing one if the forward-facing one is not hidden. However, if the back-facing brush stroke has a sequence number larger than the forward-facing one (meaning it was painted last by the artist), but is close enough to the forward-facing brush stroke so that painter's order priority is selected, then the back-facing brush stroke will erroneously be painted last. To prevent this, the sequence numbers of all brush strokes with stroke points on surfaces facing away from the camera (after splitting around edges as described above) are re-assigned to a range of sequence numbers lower than the range used for the forward-facing brush strokes. This ensures that the back-facing brush stroke above is painted before the forward-facing one, even when painter's order priority is used.

Blending An Arbitrary Number of Overlapping Brush Strokes

Figure 27:
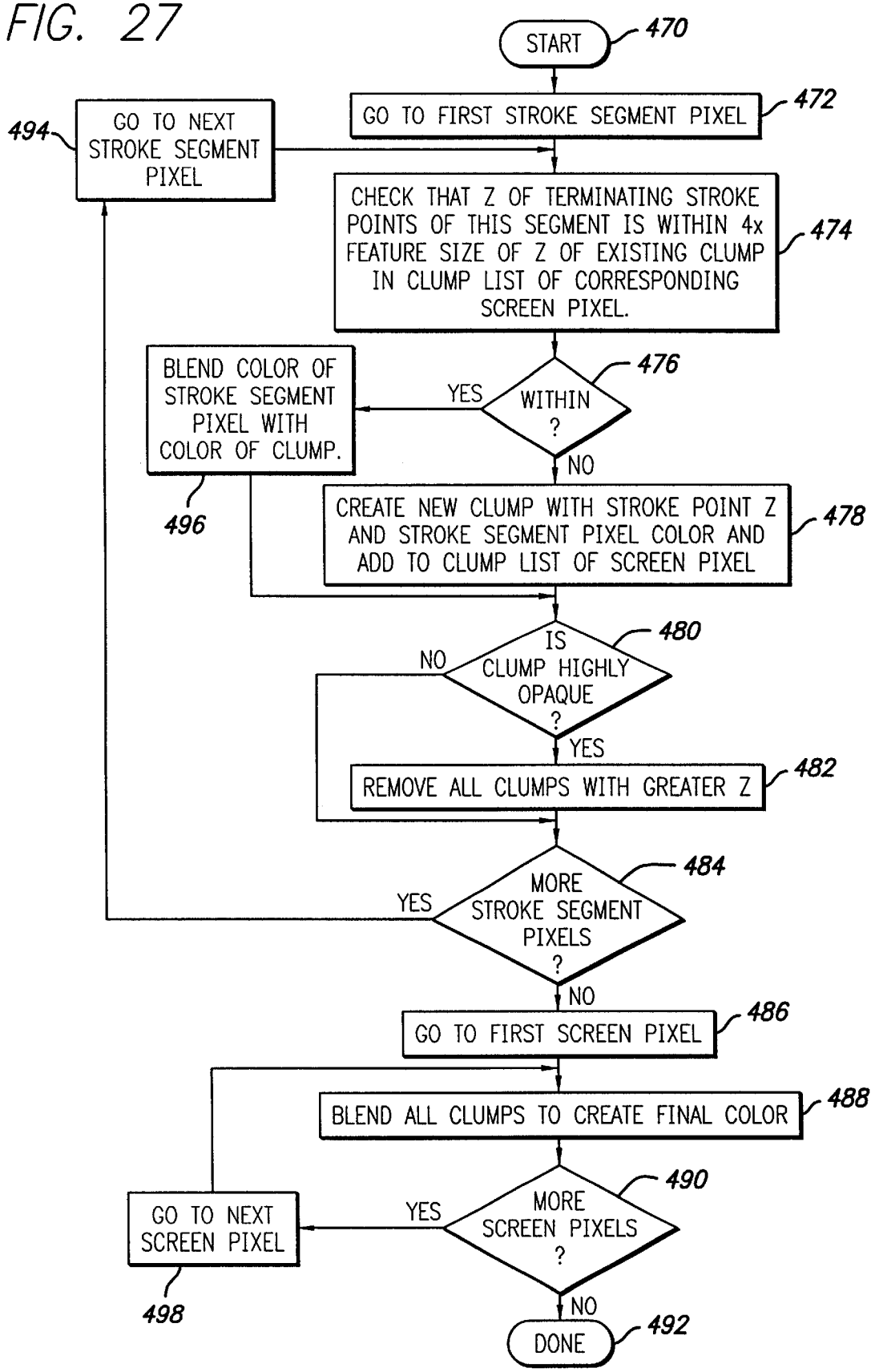
FIG. 27 is a flow chart illustrating how the present invention paints an arbitrary number of overlapping brush strokes using a clump rendering routine.

FIGS. 27–28 describe how the present invention paints an arbitrary number of overlapping brush strokes. According to one embodiment of the invention, a list is created for each pixel. A data item on a list contains the following information for each brush stroke at a given pixel:

1. a z-axis distance, which is the distance of a terminating stroke point of a stroke segment of a brush stroke from the camera along a z-axis in the camera eye coordinates, where the parameters associated with the stroke point, stroke segment, and brush stroke affect the pixel color at the pixel as described in the Brush Implementation Technique section.

2. a stroke width at a terminating stroke point of a stroke segment of the brush stroke affecting the pixel. The stroke width is used to compute the feature size as described in the Color Blending section.
3. a sequence number of the brush stroke where a brush stroke having a higher sequence number means that an artist painted the brush stroke at a later time. The sequence number is used to determine the painter's order.
4. a pixel color of the brush stroke at the pixel, as computed using the Brush Implementation Technique.

The fists are initially empty. As new brush strokes are painted to each pixel, the data items described above are inserted into the lists which are sorted by the first field, the z-axis distance. Then each list is processed from top to bottom—two brush strokes at a time—to re-paint each pixel using the stroke overlap routine described with reference to FIG. 26 and the color composition operation described in the Brush Implementation Technique section. This method, however, is very memory intensive since a long list must be maintained for each pixel until the final painting is done. This memory requirement can be significantly reduced in the second embodiment of the present invention which is the preferred embodiment.

The preferred embodiment of the present invention takes advantage of the fact that brush strokes which are close together in the z direction tend to be on the same surface and such brush strokes are processed in the order in which they are painted. This means that if a new brush stroke is close enough to another brush stroke in the z direction, the new brush stroke can be assumed to be on the same surface as the other brush stroke, and its color is blended with that of the other brush stroke when the new brush stroke is to be painted for the first time during the painting process described at block 206 in FIG. 13. If two brush strokes are far apart in the z direction, then another brush stroke may later be painted which is between them in the z direction. Thus, in this situation, the colors of the two brush strokes cannot be blended at the time when the new brush stroke is introduced for painting for the first time at block 206 in FIG. 13.

According to the preferred embodiment of the present invention, a "clump" list is created for each pixel, as the brush strokes are painted. Each clump on a clump list has the type of information contained in a data item described above (i.e., a z-axis distance, stroke width, sequence number, and pixel color). Initially, the clump lists are empty. As a new brush stroke is painted into the pixel, each of the previously formed clumps is checked to see if the z-axis distance of the new brush stroke is close to that of any of the previously formed clumps.

If such a clump is found, the pixel color of the new brush stroke is blended into the pixel color of the clump found using the stroke overlap routine described with respect to FIG. 26 and the color composition operation. If no such clump is found, a new clump for the brush stroke is created at the appropriate position in the list so that the list is sorted by the first field which is the z-axis distance. A reasonable threshold for considering a new brush stroke to be close to a previous brush stroke is four times the feature size, where feature size was described above with reference to FIG. 25. It should be noted that a threshold value different from the four times the feature size may also be used.

After all the brush strokes have been incorporated into clumps, the brush strokes are painted in depth order to create the final composite color of the pixel in the image buffer. For this operation, the clumps are assumed to be far apart because of the four times feature size check above. Therefore, the blended color value for the depth order (e.g., zero as described with reference to FIG. 26) is used in the color composition operation to determine the final composite color of the pixel. The blended color value computation such as that in block 456 in FIG. 26 is not required.

This technique saves memory because brush strokes tend to be clumped: artists paint relatively more brush strokes on relatively few surfaces which are mapped to any pixel. In the first embodiment discussed above, the number of data items which must be stored for blending is the number of brush strokes. In the second embodiment which is the preferred embodiment, the number of data items (or the number of clumps) is the number of surfaces.

A further improvement of this scheme utilizes the opacity characteristics of clumps. If a clump is highly opaque, all the clumps after it on the clump list (i.e., clumps having larger z-axis distance values) are hidden and are therefore not needed for blending. Thus, if such a clump is discovered on the list, all clumps after it can be removed, freeing up the memory they use. The opacity of each clump can be checked when it is created and each time a new brush stroke is blended into it.

FIG. 27 is a flow chart illustrating a clump rendering routine which can blend an arbitrary number of overlapping brush strokes according to the present invention. This routine starts at block 470. At block 472, the first stroke segment pixel which is the first pixel of a first stroke segment of a new brush stroke is visited.

At block 474, the present invention determines whether the z-axis distance of a terminating stroke point of the first stroke segment of the new brush stroke affecting the first pixel is within the four times feature size of the z-axis distance of any of the existing clumps in the clump list of the corresponding screen pixel. If it is, then at block 496, the color of the pixel of the new brush stroke is blended into the color of the corresponding pixel of the clump using the stroke overlap routine described in FIG. 26 and the color composition operation described in the Brush Implementation Technique section.

If the z-axis distance of the stroke point is not within the range, then at block 478, the clump rendering routine creates a new clump for the first stroke segment pixel including information such as the z-axis distance, stroke width, sequence number, and pixel color. This new clump is added to the clump list of the screen pixel.

At block 480, the present invention determines whether the new clump formed at block 478 or the clump modified at block 496 is highly opaque. If it is, then at block 482, all the clumps having z-axis distances greater than that of the highly opaque clump are removed from the clump list.

At block 484, the clump rendering routine checks if there are more stroke segment pixels. If there are, then at block 494, the next stroke segment pixel is visited. If there are no more stroke segment pixels then at block 486, the clump list for the first screen pixel which is the first pixel on the screen is visited. At this point, the current screen pixel is set to the first screen pixel.

At block 488, all the clumps in the clump list are blended to create the final composite color for the current screen pixel using the blended color value for depth order and the color composition operation described in the Brush Implementation Technique section. Block 490 determines whether there are more pixels on the screen. If there are, then the clump list for the next screen pixel is visited at block 498. Blocks 488, 490, and 498 are repeated until there are no more screen pixels. The routine ends at block 492. FIG. 28 is one exemplary pseudo code for the clump rendering routine described in FIG. 27.

Exemplary Computer System

Figure 29:
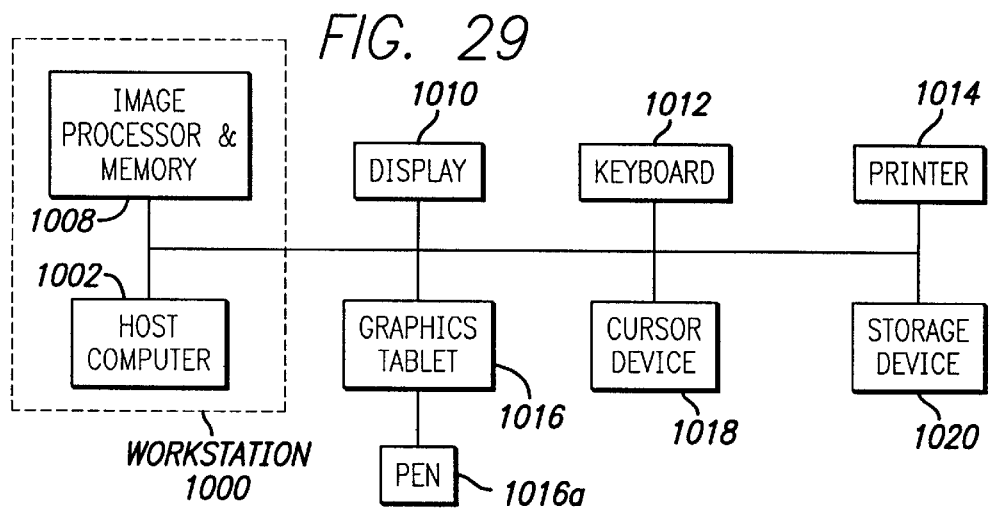
FIG. 29 is a block diagram of an exemplary computer system utilizing the present invention.

FIG. 29 illustrates an exemplary computer system that utilizes the present invention. A workstation 1000 includes a host computer 1002 which may be a commercially available computer such as one offered by Sun or Silicon Graphics and an image processor and memory unit 1008 which is designed to accommodate pixel image data. A system bus 1022 is provided for communicating information. A display device 1010 is a device suitable for displaying graphic images and alphanumeric characters recognizable to a user. The display device 1010 may show various sliders such as size, color, the degree of opacity, and the degree of softness to allow an artist to select the values of these sliders for each brush stroke. An input device such as a keyboard 1012 is provided for communicating information and command selections to the host computer 1002.

A graphics tablet 1016 such as WACOM tablet with a pen 1016a is coupled to the system bus 1022. The graphics tablet 1016 is pressure sensitive. An artist can use the pen 1016a and the graphics tablet 1016 to paint objects shown on the display device 1010. As the artist applies 2-D brush strokes on the graphics tablet 1016 using the pen 1016a, the host computer 1002 records the tracks of the 2-D brush strokes as 2-D stroke points. The host computer 1002 also records the pen pressure at each of the 2-D stroke points.

The computer system may also include a cursor device 1018 that allows a user to dynamically signal the 2-D movement of the visual symbol (pointer) on the display device 1010. A storage device 1020 such as a magnetic disk or optical disk may be coupled to the system bus. The computer system may also include a printer 1014 for outputting data.

While the present invention has been particularly described with reference to the various figures and embodiments, it should be understood that these are for illustration only and should not be taken as limiting the scope of the invention. There may be many other ways to implement the 3-D mapping process, stroke rendering process, leaf strokes, selective focus, brush implementation technique, and stroke overlap technique of the present invention. Many changes and modifications may be made to the invention, by one having ordinary skill in the art, without departing from the spirit and scope of the invention.

What is claimed is:

1. A method for producing a computer-assisted animated film, comprising the steps of:
   generating a 3-D model of an object;
   selecting a first view of said object;
   applying 2-D brush strokes to said first view;
   generating 2-D stroke points by sampling tracks of 2-D brush strokes applied to said view of said object;
   determining a 2-D stroke width and width direction at each of said 2-D stroke points;
   translating said 2-D stroke points into 3-D stroke points;
   translating said 2-D stroke widths and width directions into a 3-D stroke width and width direction at each of said 3-D stroke points; applying color to said object according to said 3-D stroke width and width direction at each of said 3-D stroke points;
   selecting a second view of said object that reveal surfaces that were occluded in said first view;
   applying additional 2-D brush strokes to said second view;
   generating additional 2-D stroke points by sampling tracks of said additional 2-D brush strokes applied to said second view of said object;
   determining a 2-D stroke width and width direction at each of said additional 2-D stroke points;
   translating said additional 2-D stroke points into 3-D stroke points;
   translating said 2-D stroke widths and width directions into a 3-D stroke width and width direction at each of said 3-D stroke points; and
   applying color to said object according to said 3-D stroke width and width direction at each of said 3-D stroke points.

2. The method of claim 1, wherein said first view corresponds to one of views generated during said rendering or re-rendering step, and
   wherein said second view corresponds to one of views generated during said re-rendering step.

3. The method of claim 1, wherein said 3-D model includes light information.

4. The method of claim 1, wherein said step of applying 2-D brush strokes comprises the steps of:
   selecting a size of a 2-D brush stroke; and
   selecting a color of a 2-D brush stroke.

5. The method of claim 4, wherein said step of applying 2-D brush strokes further comprises the steps of:
   selecting a degree of softness of a 2-D brush stroke; and
   selecting a degree of opacity of a 2-D brush stroke.

6. The method of claim 1, wherein each of said 2-D brush strokes comprises a plurality of 2-D stroke points,
   wherein said step of applying 2-D brush strokes comprises the steps of:
      sampling a track of said 2-D brush strokes as 2-D stroke points; and
      obtaining a pressure at each of said sampled 2-D stroke points.

7. The method of claim 6, wherein each of said 2-D stroke points has a corresponding 2-D stroke width,
   wherein a 2-D stroke width of a 2-D brush stroke is a function of a selected size of said 2-D brush stroke and a pressure at its respective 2-D stroke point.

8. The method of claim 1, wherein said step of applying 2-D brush strokes comprises the step of:
   displaying said 2-D brush strokes,
   wherein said step of displaying comprises the step of:
      determining a pixel color of a displayed 2-D brush stroke at a pixel based on a selected size and a selected color of said displayed 2-D brush stroke.

9. The method of claim 6, wherein said step of applying 2-D brush strokes further comprises the step of:
   displaying said 2-D brush strokes,
   wherein said step of displaying comprises the step of:
      determining a pixel color of a displayed 2-D brush stroke at a pixel based on pressures at two 2-D stroke points that affect said pixel.

10. The method of claim 6, wherein said step of applying 2-D brush strokes further comprises the step of:
    displaying said 2-D brush strokes,
    wherein said step of displaying comprises the step of:
       determining a pixel color of a displayed 2-D brush stroke at a pixel based on a selected size, a selected color, and a selected degree of opacity of said displayed 2-D brush stroke, pressures, and the location of said pixel.

11. The method of claim 10, wherein said pressures are pressures at two 2-D stroke points that affect said pixel.

12. The method of claim 10, wherein said pixel color is determined based further on a brush profile.

13. The method of claim 12, wherein said brush profile varies with a pixel's normal distance from a 2-D stroke segment that affect said pixel.

14. The method of claim 12, wherein said pixel color is determined based further on a selected degree of softness of said displayed 2-D brush stroke, wherein said selected degree of softness determines a width of a filter to be applied to said brush profile.

15. The method of claim 12, wherein said brush profile is an analytical function.

16. The method of claim 12, wherein said brush profile is filtered using an analytical function.

17. The method of claim 1, wherein said step of applying 2-D brush strokes comprises the step of:

displaying said 2-D brush strokes, wherein said step of displaying comprises the step of:

determining a pixel color of a displayed 2-D brush stroke at a pixel using an analytical function rather than a numerical function so that said displayed 2-D brush stroke is resolution independent.

18. The method of claim 1, wherein said 2-D brush strokes are resolution independent, and wherein said step of rendering produces brush strokes that are resolution independent.

19. The method of claim 1, wherein said step of applying 2-D brush strokes comprises the step of:

saving 2-D brush stroke information including:
  size, softness, color, and opacity information for each 2-D brush stroke;
  2-D location information for each 2-D stroke point; and
  pressure information for each 2-D stroke point.

20. The method of claim 1, wherein said step of translating said 2-D stroke widths and width directions into a 3-D stroke width and width direction at each of said 3-D stroke points further comprises the steps of:

generating a rendered image of said first view having u and v parameters and surface numbers encoded into rendered pixels of said rendered image, wherein one of said u parameters and one of said v parameters encoded into a rendered pixel are obtained from u and v parameters at a surface location of said object corresponding to said rendered pixel, and wherein one of said surface numbers encoded into said rendered pixel is obtained from a surface number at said surface location of said object.

21. The method of claim 1, wherein if said 3-D brush strokes are leaf strokes, then said step of mapping said 2-D brush strokes onto said 3-D model further comprises the steps of:

determining a pivot point of a leaf, wherein said leaf comprises said 3-D brush strokes, and each of said 3-D brush strokes comprises 3-D stroke points; and determining an offset for each of said 3-D stroke points relative to said pivot point.

22. The method of claim 1, wherein the total number of views used for the steps of applying 2-D brush strokes and applying additional 2-D brush strokes is less than the number of views rendered during the step of re-rendering.

23. An apparatus for producing a computer-assisted animated film, comprising:

means for generating a 3-D model of an object;

means for selecting a first view of said object;

means for applying 2-D brush strokes to said first view;

means for generating 2-D stroke points by sampling tracks of 2-D brush strokes applied to said view of said object;

means for determining a 2-D stroke width and width direction at each of said 2-D stroke points;

means for translating said 2-D stroke points into 3-D stroke points;

means for translating said 2-D stroke widths and width directions into a 3-D stroke width and width direction at each of said 3-D stroke points;

means for applying color to said object according to said 3-D stroke width and width direction at each of said 3-D stroke points;

means for selecting a second view of said object that reveal surfaces that were occluded in said first view;

means for applying additional 2-D brush strokes to said second view;

means for generating additional 2-D stroke points by sampling tracks of said additional 2-D brush strokes applied to said second view of said object;

means for determining a 2-D stroke width and width direction at each of said additional 2-D stroke points;

means for translating said additional 2-D stroke points into 3-D stroke points;

means for translating said 2-D stroke widths and width directions into a 3-D stroke width and width direction at each of said 3-D stroke points; and means for applying color to said object according to said 3-D stroke width and width direction at each of said 3-D stroke points.

* * * * *

UNITED STATES PATENT AND TRADEMARK OFFICE
CERTIFICATE OF CORRECTION

PATENT NO. : 6,268,865 B1
DATED : July 31, 2001
INVENTOR(S) : Eric Daniels et al.

It is certified that error appears in the above-identified patent and that said Letters Patent is hereby corrected as shown below:

Column 7,
Line 5, delete "with" and substitute -- width --.

Column 9,
Line 56, after "then", delete "C" and substitute -- $C_{cmp}$ --

Column 17,
Line 16, delete $$W_a = x_1\left(\frac{dP_p}{du}\right)_n + y_1\left(N_a x \frac{dP_p}{du}\right)_n + z_1(N_a)_n ,$$

and substitute $$W_a = x_1\left(\frac{dP_a}{du}\right)_n + y_1\left(N_a x \frac{dP_a}{du}\right)_n + z_1(N_a)_n$$

Column 22,
Line 62, delete $$d = \sqrt{|P_1 - P_2|^2 + 30|W|^2}$$

and substitute $$d = \sqrt{|P_1 - P_2|^2 + |W|^2}$$

UNITED STATES PATENT AND TRADEMARK OFFICE
CERTIFICATE OF CORRECTION

PATENT NO. : 6,268,865 B1
DATED : July 31, 2001
INVENTOR(S) : Eric Daniels et al.

It is certified that error appears in the above-identified patent and that said Letters Patent is hereby corrected as shown below:

Column 25,
Line 16, delete "fists" and substitute -- lists --.

Signed and Sealed this

Twelfth Day of March, 2002

Attest:

JAMES E. ROGAN
Attesting Officer
Director of the United States Patent and Trademark Office